(12) United States Patent
Pan

(10) Patent No.: US 10,831,070 B2
(45) Date of Patent: Nov. 10, 2020

(54) DISPLAY PANEL

(71) Applicant: Himax Display, Inc., Tainan (TW)

(72) Inventor: Po-Hung Pan, Tainan (TW)

(73) Assignee: Himax Display, Inc., Tainan (TW)

( * ) Notice: Subject to any disclaimer, the term of this patent is extended or adjusted under 35 U.S.C. 154(b) by 29 days.

(21) Appl. No.: 16/149,086

(22) Filed: Oct. 1, 2018

(65) Prior Publication Data

US 2020/0103683 A1  Apr. 2, 2020

(51) Int. Cl.
  *G02F 1/1339* (2006.01)
  *G02F 1/1335* (2006.01)

(52) U.S. Cl.
  CPC ...... *G02F 1/1339* (2013.01); *G02F 1/133512* (2013.01); *G02F 2001/13398* (2013.01); *G02F 2201/501* (2013.01)

(58) Field of Classification Search
  CPC ... G02F 1/1339; G02F 1/13392; G02F 1/1341
  See application file for complete search history.

(56) References Cited

U.S. PATENT DOCUMENTS

| | | | |
|---|---|---|---|
| 6,357,763 B2* | 3/2002 | Mathew | G02F 1/1339 349/155 |
| 6,642,992 B2* | 11/2003 | Kim | G02F 1/1339 349/153 |
| 6,646,709 B2* | 11/2003 | Matsumoto | G02F 1/1339 349/153 |
| 6,882,399 B2* | 4/2005 | Park | G02F 1/1339 349/153 |
| 8,314,551 B2* | 11/2012 | Song | H01L 51/5246 313/504 |
| 9,004,972 B2 | 4/2015 | Choi et al. | |
| 2008/0151172 A1* | 6/2008 | Kondo | G02F 1/1339 349/153 |

FOREIGN PATENT DOCUMENTS

| | | |
|---|---|---|
| CN | 106298691 | 1/2017 |
| CN | 104254442 | 2/2017 |
| TW | I335680 | 1/2011 |
| TW | I405494 | 8/2013 |
| TW | M496778 | 3/2015 |
| WO | 2011001573 | 1/2011 |

* cited by examiner

*Primary Examiner* — Dung T Nguyen
(74) *Attorney, Agent, or Firm* — JCIPRNET

(57) ABSTRACT

A display panel according to an embodiment includes a top substrate, a bottom substrate, a display medium layer, and a sealing structure. The bottom substrate is opposite to the top substrate, and the display medium layer is disposed between the top substrate and the bottom substrate. The sealing structure is sandwiched between the top substrate and the bottom substrate. The sealing structure encircles the display medium layer. The sealing structure includes a sealing layer and a sealing barrier. The sealing layer includes at least an inner sealing portion. The sealing barrier encircles the inner sealing portion of the sealing layer. The sealing barrier is made of an inorganic material. The inner sealing portion is positioned between the sealing barrier and the display medium layer.

21 Claims, 22 Drawing Sheets

DISPLAY PANEL

BACKGROUND OF THE DISCLOSURE

1. Field of the Disclosure

The present disclosure generally relates to an electronic device, in particular, to a display panel.

2. Description of Related Art

In a typical display panel, a display medium layer is sandwiched between a top substrate and a bottom substrate. The top substrate and the bottom substrate are kept together via a sealant to form a display cell.

After assembly, the display panel may be exposed to adventitious moisture from the environment or other external contaminants. The sealant, typically made of curable organic materials, may constitute one of the access routes to the display panel for such moisture, which may compromise the performance of the display panel, lowering the quality of the displayed images and shortening the lifetime of the display panel.

SUMMARY OF THE DISCLOSURE

Accordingly, the present disclosure is directed to a display panel including a sealing structure comprising a sealing layer and a sealing barrier.

Accordingly, the present disclosure is directed to a display panel including a sealing structure to protect the display medium layer.

According to an embodiment, a display panel may include a top substrate, a bottom substrate, a display medium layer, and a sealing structure. The bottom substrate may be opposite to the top substrate, and the display medium layer may be disposed between the top substrate and the bottom substrate. The sealing structure may be sandwiched between the top substrate and the bottom substrate. The sealing structure may encircle the display medium layer. The sealing structure may include a sealing layer and a sealing barrier. The sealing layer may include an inner sealing portion. The sealing barrier may encircle the inner sealing portion of the sealing layer. The sealing barrier may be made of an inorganic material having a water vapour transmittance rate smaller than the sealing layer. The inner sealing portion may be positioned between the sealing barrier and the display medium layer.

According to an embodiment, the sealing barrier is in physical contact with the sealing layer.

According to an embodiment, an outer edge of the sealing barrier may be aligned with an outer edge of the top substrate.

According to an embodiment, a thickness of the sealing barrier may be equal to a thickness of the inner sealing portion.

According to an embodiment, a thickness of the sealing barrier may be less than a thickness of the inner sealing portion.

According to an embodiment, the sealing layer may further include a complemental sealing portion stacked with the sealing barrier, and a total thickness of the sealing barrier and the complemental sealing portion may equal the thickness of the inner sealing portion.

According to an embodiment, the sealing barrier may include a first barrier portion and a second barrier portion, and the complemental sealing portion may be positioned between the first barrier portion and the second barrier portion.

According to an embodiment, the complemental sealing portion may be disposed between the sealing barrier and one of the top substrate and the bottom substrate.

According to an embodiment, the sealing layer may further include an outer sealing portion surrounding the sealing barrier, and the sealing barrier may be positioned between the outer sealing portion and the inner sealing portion.

According to an embodiment, a gap may separate an edge of the sealing barrier from the sealing layer.

According to an embodiment, the display panel may further include a light shielding layer having a ring-like shape. The light shielding layer may be disposed on a surface of the top substrate facing away from the display medium layer, may shield the inner sealing portion and a portion of the display medium layer close to the inner sealing portion, and may expose the other portion of the display medium layer.

According to an embodiment, an inner edge of the sealing barrier may be coplanar with an outer edge of the light shielding layer.

According to an embodiment, an outer edge of the sealing barrier may be coplanar with an outer edge of the light shielding layer.

According to an embodiment, a vertical projection of an outer edge of the light shielding layer may fall between an outer edge and an inner edge of the sealing barrier.

According to an embodiment, the inorganic material may include silicon oxide, silicon nitride, silicon oxynitride, metal oxide, metal nitride, metal oxynitride, or a combination thereof. In some embodiment, metal oxide may include titanium oxide, aluminium oxide, or metal oxides other than titanium oxide and aluminium oxide.

According to an embodiment, the sealing barrier may be formed of a plurality of barrier layers.

According to an embodiment, the barrier layers may stack sequentially in a direction from the top substrate to the bottom substrate.

According to an embodiment, the barrier layers may be arranged in a coplanar manner on one of the top substrate and the bottom substrate.

According to an embodiment, the display panel further includes a top alignment layer disposed between the display medium layer and the top substrate and a bottom alignment layer disposed between the display medium layer and the bottom substrate.

According to an embodiment, the top alignment layer may be disposed on the top substrate in a coplanar manner with the inner sealing portion.

According to an embodiment, the bottom alignment layer may be disposed on the bottom substrate in a coplanar manner with the inner sealing portion.

According to an embodiment, the sealing layer may be made of a curable material.

In view of the above, the display panel in accordance with some embodiments of the disclosure includes the sealing structure disposed between the top substrate and the bottom substrate and encircling the display medium layer. The packaging structure may include a sealing layer and a sealing barrier having a water vapor transmittance rate smaller than the sealing layer. Accordingly, the sealing structure of the display panel may provide the desired protective function for the display medium layer of the display panel.

BRIEF DESCRIPTION OF THE DRAWINGS

The accompanying drawings are included to provide further understanding of the disclosure, and are incorporated in and constitute a part of this specification. The drawings illustrate embodiments of the disclosure and, together with the description, serve to explain the principles of the disclosure.

Figure 1:
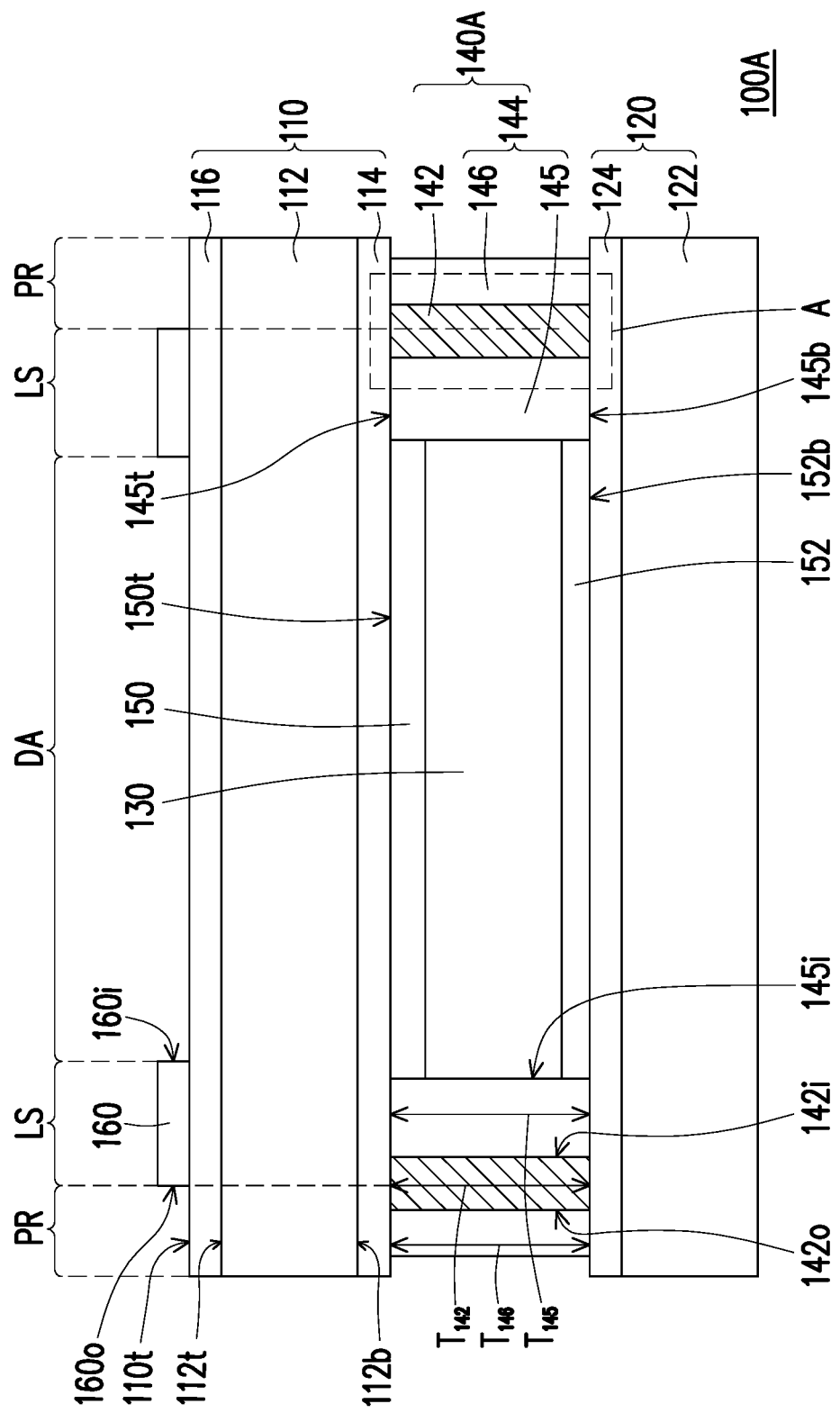
FIG. 1 shows a schematic cross-sectional view of a display panel according to an embodiment of the present disclosure.

In the drawings, the relative dimensions of the illustrated components might have been altered for the sake of clarity.

DESCRIPTION OF THE EMBODIMENTS

Reference will now be made in detail to the present preferred embodiments of the disclosure, examples of which are illustrated in the accompanying drawings.

Wherever possible, the same reference numbers are used in the drawings and the descriptions to refer to the same or like parts.

In the disclosure of the present disclosure, the locution "an element A is disposed on an element B", used to describe a positional relationship, encompasses the possibilities of one or multiple other elements disposed between the element A and the element B, as well as the case of no other elements existing between the element A and the element B.

FIG. 1 shows a cross-sectional view of a display panel 100A according to some embodiments of the present disclosure. As shown in the cross-sectional view of FIG. 1, the display panel 100A includes a top substrate 110, a bottom substrate 120 opposite to the top substrate 110, a display medium layer 130, and a sealing structure 140A. The top substrate 110 and the bottom substrate 120 are assembled via the sealing structure 140A. The display medium layer 130 is sandwiched between the top substrate 110 and the bottom substrate 120 and is surrounded by the sealing structure 140A. The display medium layer 130 may be made of liquid crystals, so that the top substrate 110, the bottom substrate 120, the display medium layer 130, and the sealing structure 140A may serve as a liquid crystal cell, but the disclosure is not limited thereto. In some embodiments, a top alignment layer 150 is disposed between the top substrate 110 and the display medium layer 130, and a bottom alignment layer 152 is disposed between the display medium layer 130 and the bottom substrate 120.

In some embodiments, the top substrate 110 includes a support plate 112, an electrode layer 114, and an anti-reflective layer 116. The electrode layer 114 is disposed on a bottom surface 112b of the support plate 112 closer to the display medium layer 130, and the anti-reflective layer 116 is disposed on a top surface 112t of the support plate 112 farther away from the display medium layer 130. The electrode layer 114 may be made of ITO or any other material that is conductive and transparent to the display light, and the support plate 112 may be made of glass, but the disclosure is not limited thereto. In some embodiments, the anti-reflective layer 116 extends over the whole top surface 112t of the support plate 112. A material of the anti-reflective layer 116 may be silicon oxide, titanium oxide, or a combination of both.

The bottom substrate 120 may be a transistor array substrate comprising a support substrate 122, such as a glass plate or a silicon backplane, and a transistor array 124 disposed thereon. The transistor array 124 may be a thin film transistor array, a CMOS (Complementary Metal-Oxide Semiconductor) device array, or the like. The transistor array 124 and the electrode layer 114 may be used for providing the driving electric field to drive the display medium layer 130. In some embodiments, the display panel 100A may be a Thin Film Transistor Liquid Crystal Display (TFT-LCD) panel or an LCoS (Liquid Crystal on Silicon) display panel. In some embodiments, the electrode layer 114 may be omitted based on the driving circuit design of the display panel 100A. For sake of simplicity, in some of the drawings of the disclosure the top substrate 110 and the bottom substrate 120 may be shown as plate-like structures. It is to be intended that in display panels according to some embodiments of the disclosure, each of the elements listed above for the top substrate 110 and the bottom substrate 120 may be present, according to design and production requirements.

The sealing structure 140A is disposed between the top substrate 110 and the bottom substrate 120 and encircles the display medium layer 130. In some embodiments, the sealing structure 140A has a ring-like structure surrounding the display medium layer 130. The ring-like structure may include one or more concentric layers, with the outer layers encircling the inner layers. In some embodiments, the sealing structure 140A includes a sealing barrier 142 and a sealing layer 144. As shown in FIG. 1, in the display panel 100A, the sealing layer 144 includes an inner sealing portion 145 and an outer sealing portion 146. The inner sealing portion 145 surrounds the display medium layer 130 and is located between the display medium layer 130 and the sealing barrier 142. The inner sealing portion 145 may constitute an innermost layer of the sealing structure 140A, that is, the layer of the sealing structure 140A closest to the display medium layer 130. The outer sealing portion 146 surrounds the sealing barrier 142. In some embodiments, the outer sealing portion 146 constitutes the outermost layer of the sealing structure 140A. The sealing barrier 142 is sandwiched between the inner sealing portion 145 and the outer sealing portion 146. In some alternative embodiments, the outer sealing portion 146 may be omitted, and the sealing barrier 142 constitutes the outermost layer of the sealing structure 140A. In some embodiments, the sealing barrier 142 physically contacts the sealing layer 144, but the disclosure is not limited thereto. In some alternative embodiments, the sealing barrier 142 contacts only one of the inner sealing portion 145 and the outer sealing portion 146. In some alternative embodiments, the sealing barrier 142 does not physically contact the inner sealing portion 145 and the outer sealing portion 146. Furthermore, in the display panel 100A, the respective thicknesses $T_{142}$, $T_{145}$ and $T_{146}$ of the sealing barrier 142, the inner sealing portion 145 and the outer sealing portion 146 are substantially equal, and correspond to a distance between the top substrate 110 and the bottom substrate 120. In some embodiments, by contacting the top substrate 110 and the bottom substrate 120, the sealing barrier 142 may contribute to the stabilization of the cell gap of the display panel 100A. In some alternative embodiments, the thickness $T_{142}$ of the sealing barrier 142 may be less than the thickness $T_{145}$ of the inner sealing portion 145. In some embodiments, the sealing barrier 142 may contact only one of the top substrate 110 and the bottom substrate 120.

A material of the sealing layer 144 may include a curable material. In some embodiments, the curable material may be a thermally curable material, a photochemically curable material, or a thermo-photocurable material. A material of the sealing layer 144 may include organic resins such as epoxy resins, acrylates, or the like. The sealing barrier 142 may include inorganic materials, such as silicon oxide, silicon nitride, silicon oxynitride, metal oxide, metal nitride, metal oxynitride, or a combination thereof. In some embodiments, metal oxide may include titanium oxide, aluminium oxide, or metal oxides other than titanium oxide and aluminium oxide. A material of the sealing barrier 142 may have a lower water vapour transmission rate than a material of the sealing layer 144. For example, the water vapor transmission rate of the sealing barrier 142 may be less than 0.5 $g/m^2/day$ and the water vapor transmission rate of the sealing layer 144 may be greater than 10 $g/m^2/day$. As such, inclusion of the sealing barrier 142 in the sealing structure 140A may protect the display medium layer 130 and the display panel 100A against adventitious moisture or other environmental contaminants. Whilst in the display panel 100A of FIG. 1, the sealing structure 140A is shown to include one sealing barrier 142 sandwiched between one inner sealing portion 145 and one outer sealing portion 146, in some other embodiments multiple sealing barriers may be alternately disposed with multiple sealing portions within the light shielding region LS and the peripheral region PR of the display panel.

In some embodiments, the top alignment layer 150 and the bottom alignment layer 152 may be disposed between the display medium layer 130 and the top substrate 110 and between the display medium layer 130 and the bottom substrate 120, respectively. In some embodiments, the top alignment layer 150 is disposed on the top substrate 110 in a coplanar manner with the inner sealing portion 145. That is, a top surface 145t of the inner sealing portion 145 is coplanar with a top surface 150t of the top alignment layer 150 further away from the display medium layer 130. In some embodiments, the bottom alignment layer 152 is disposed on the bottom substrate 120 in a coplanar manner with the inner sealing portion 145. That is, a bottom surface 145b of the inner sealing portion 145 is coplanar with a bottom surface 152b of the bottom alignment layer 152 further away from the display medium layer 130. A material of the top alignment layer 150 and the bottom alignment layer 152 may include an organic alignment layer, such as a polyimide layer, or an inorganic alignment layer, such as an obliquely deposited silicon oxide layer. If an obliquely deposited silicon oxide layer is used, the surface of the silicon oxide layer may be modified with hydrophobic molecules such as silanes, fluorinated silanes, acids, and long-chain alcohols. In some alternative embodiments, each of the top alignment layer 150 and the bottom alignment layer 152 may include a stack layer of at least one organic alignment layer and at least one inorganic alignment layer.

In some embodiments, a light shielding layer 160 is disposed on a top surface 110t of the top substrate 110 facing away from the display medium layer 130. In some embodiments, the anti-reflective layer 116 is disposed between the light shielding layer 160 and the top substrate 110. In some alternative embodiments, the anti-reflective layer 116 may be omitted, such that the light shielding layer 160 may physically contact the support plate 112. The light shielding layer 160 may have a ring-like shape, and may define a light shielding region LS of the display panel 100A.

In some alternative embodiments, the light shielding layer 160 may be disposed following other patterns or layers, according to the requirements of the design. The light shielding layer 160 may be disposed over the inner sealing portion 145 and a portion of the display medium layer 130 closer to the inner sealing portion 145, while exposing the remaining part of the display medium layer 130. As shown in FIG. 1, the light shielding layer 160 may overlap with a portion of the sealing barrier 142, so that the sealing barrier 142 extends at least in part within the area beneath the light shielding region LS.

The patterned light shielding layer 160 has a light shielding effect. The display light of the display panel 100A may be obstructed or shielded by the light shielding layer 160, so that a displayed image may be presented in a display area DA located beside the light shielding region LS. In some embodiments, the light shielding region LS has a ring-like pattern when viewed from the top, and surrounds the display area DA. A boundary between the light shielding region LS and the display area DA of the display panel 100A may be defined by an inner edge 160i of the light shielding layer 160. Another boundary of the light shielding region LS may be defined by an outer edge 160o opposite to the inner edge 160i of the light shielding layer 160. In some embodiments, the outer edge 160o defines the boundary of the light shielding region LS and an outermost peripheral region PR, in which the outer sealing portion 146 is located. As such, the sealing structure 140A may extend within the light shielding region LS and the peripheral region PR. The width and position of the light shielding layer 160 may be arranged in a manner that the light shielding layer 160 completely shields the inner sealing portion 145. For example, an inner edge 145i of the inner sealing portion 145 may be positioned inside the light shielding region LS. In some embodiments, a vertical projection of the outer edge 160o of the light shielding layer 160 falls on the sealing barrier 142, in between an outer edge 142o and an inner edge 142i of the sealing barrier 142. The light shielding layer 160 may present a sharp pattern, with the inner edge 160i and the outer edge 160o showing good linearity. A material for the patterned light shielding layer 160 may include organic inks, but the disclosure is not limited thereto.

Figure 2A:
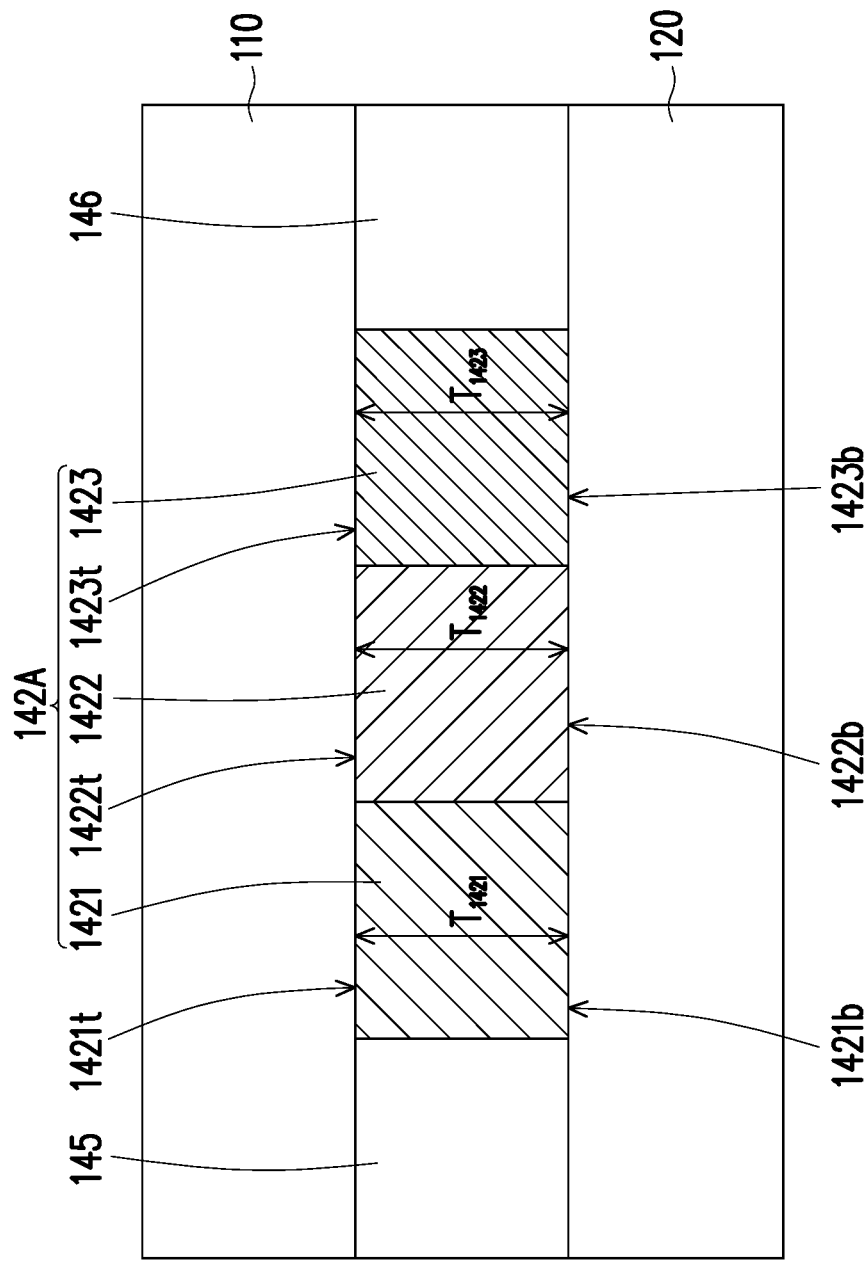
FIG. 2A and FIG. 2B show enlarged cross-sectional views of areas of some display panels according to some embodiments of the present disclosure.
Figure 2B:
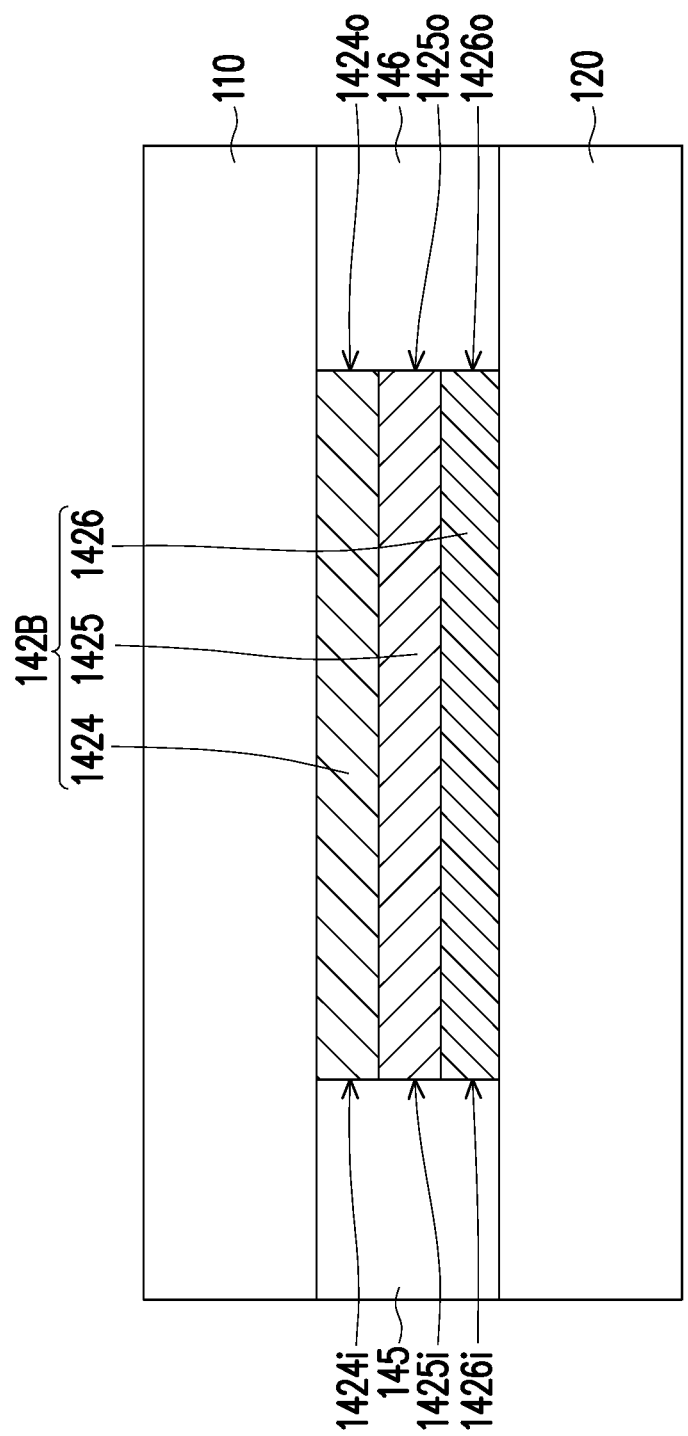

Whilst in FIG. 1 the sealing barrier 142 is shown as a single layer extending between the inner sealing portion 145 and the outer sealing portion 146, the disclosure is not limited thereto. In FIG. 2A and in FIG. 2B, are shown detailed views of alternative possible structures of the sealing barrier 142 according to some embodiments of the present disclosure. The detailed views belong to an area of some alternative display panels (not shown) corresponding to the area A of the display panel 100A shown in FIG. 1. In some embodiments, the sealing barrier 142A includes a plurality of concentric barrier layers, as shown in FIG. 2A. For example, moving from the inner sealing portion 145 to the outer sealing portion 146, the sealing barrier 142A may include an innermost barrier layer 1421, an intermediate barrier layer 1422 and an outermost barrier layer 1423. In some embodiments, the respective top surfaces 1421$t$, 1422$t$, and 1423$t$ of the barrier layers 1421, 1422, and 1423 closer to the top substrate 110 are substantially coplanar. Similarly, the respective bottom surfaces 1421$b$, 1422$b$, 1423$b$ of the barrier layers 1421, 1422, and 1423 closer to the bottom substrate 120 are substantially coplanar. In other words, the barrier layers 1421, 1422, and 1423 are arranged in a coplanar manner on one of the top substrate 110 and the bottom substrate 120. In some embodiments, the respective thicknesses $T_{1421}$, $T_{1422}$ and $T_{1423}$ of the barrier layers 1421, 1422, and 1423 are substantially equal. As shown in FIG. 2A, the sealing barrier 142A contacts both of the top substrate 110 and the bottom substrate 120, but the disclosure is not limited thereto. In some alternative embodiments, the sealing barrier 142A and the plurality of concentric bather layers constituting the sealing barrier 142A may contact only one of the top substrate 110 and the bottom substrate 120. The material of each barrier layer 1421, 1422, and 1423 may be independently selected based on design and production requirements. In some embodiments, multiple barrier layers include the same materials, but the disclosure is not limited thereto. In some embodiments, different barrier layers include different materials. Whilst in FIG. 2A the sealing barrier 142A is shown as comprising three barrier layers 1421, 1422, and 1423, the disclosure is not limited by the number of barrier layers forming the sealing barrier 142A. In some alternative embodiments, the sealing barrier may include fewer or more barrier layers than three.

In FIG. 2B is shown an alternative sealing bather 142B according to an embodiment of the disclosure. The sealing barrier 142B includes a plurality of bather layers sequentially stacked from the top substrate 110 to the bottom substrate 120. As shown in FIG. 2B, the barrier layers constructing the sealing barrier 142B includes a barrier layer 1424, a barrier layer 1425, and a barrier layer 1426. The topmost barrier layer 1424 is disposed closer to the top substrate 110 and on top of the intermediate barrier layer 1425. The intermediate barrier layer 1425 is sandwiched between the topmost barrier layer 1424 and the bottommost barrier layer 1426. The bottommost barrier layer 1426 is disposed closer to the bottom substrate 120 than the other barrier layers 1424 and 1425 of the plurality of barrier layers. Each of the barrier layers 1424, 1425, and 1426 may have a ring-like shape. The barrier layers 1424, 1425, and 1426 may be vertically aligned between the top substrate 110 and the bottom substrate 120. The respective inner edges 1424$i$, 1425$i$ and 1426$i$ of the barrier layers 1424, 1425 and 1426 closer to the inner sealing portion 145 may be coplanar. Similarly, the respective outer edges 1424$o$, 1425$o$, and 1426$o$ of the barrier layers 1424, 1425, and 1426 closer to the outer sealing portion 146 may be coplanar. In other words, the vertical projections of the barrier layers 1424, 1425, and 1426 on the top substrate 110 or the bottom substrate 120 are overlaid. The material of each barrier layer 1424, 1425, and 1426 may be independently selected based on design and production requirements. In some embodiments, multiple barrier layers include the same materials, but the disclosure is not limited thereto. In some embodiments, different barrier layers include different materials. Whilst in FIG. 2B the sealing barrier 142B is shown as comprising three barrier layers 1424, 1425, and 1426, the disclosure is not limited by the number of barrier layers forming the sealing barrier 142B. In some alternative embodiments, the sealing barrier may include fewer or more barrier layers than three.

It is to be understood that for all the display panels disclosed herein, the sealing barrier may be formed as a single layer, as shown in FIG. 1, or may have a composite structure analogous to the ones of the sealing barrier 142A and 142B shown in FIG. 2A and in FIG. 2B.

Figure 3A:
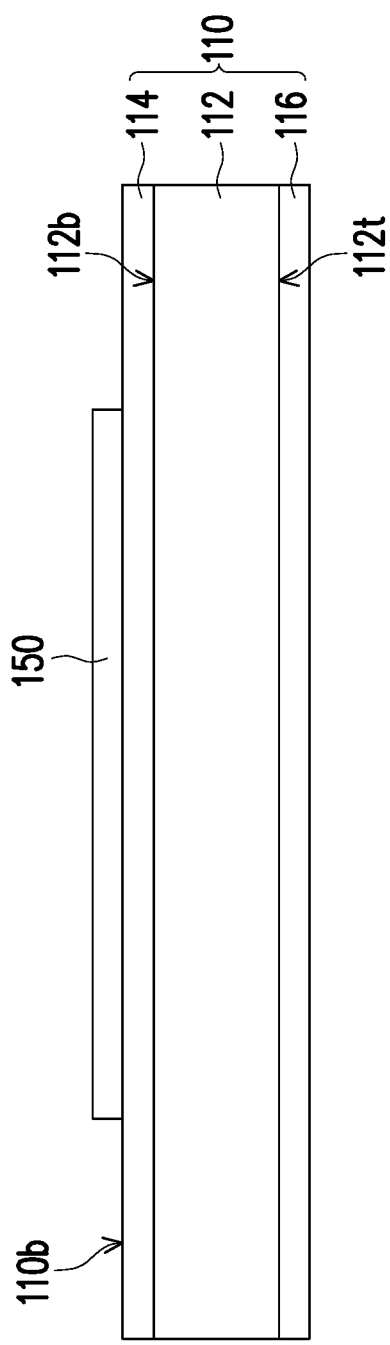
FIG. 3A to FIG. 3F show schematic cross-sectional views of a display panel undergoing a portion of the steps of a fabricating method in accordance with an embodiment of the present disclosure.

In FIG. 3A to FIG. 3H are shown schematic cross-sectional views of a display panel undergoing steps of a fabricating method according to an embodiment of the present disclosure. To begin with, the support plate 112 is provided. The anti-reflective layer 116 may be disposed on the top surface 112$t$ of the support plate 112, and an electrode layer 114 may be disposed on a bottom surface 112$b$ of the support plate 112 opposite to the top surface 112$t$. As shown in FIG. 3A, the top substrate 110 may be temporarily disposed with a bottom surface 110$b$ facing an upward direction, to facilitate formation of the subsequent components of the display panel. The top alignment layer 150 may be formed over the electrode layer 114 in a central region of the top substrate 110.

Figure 3B:
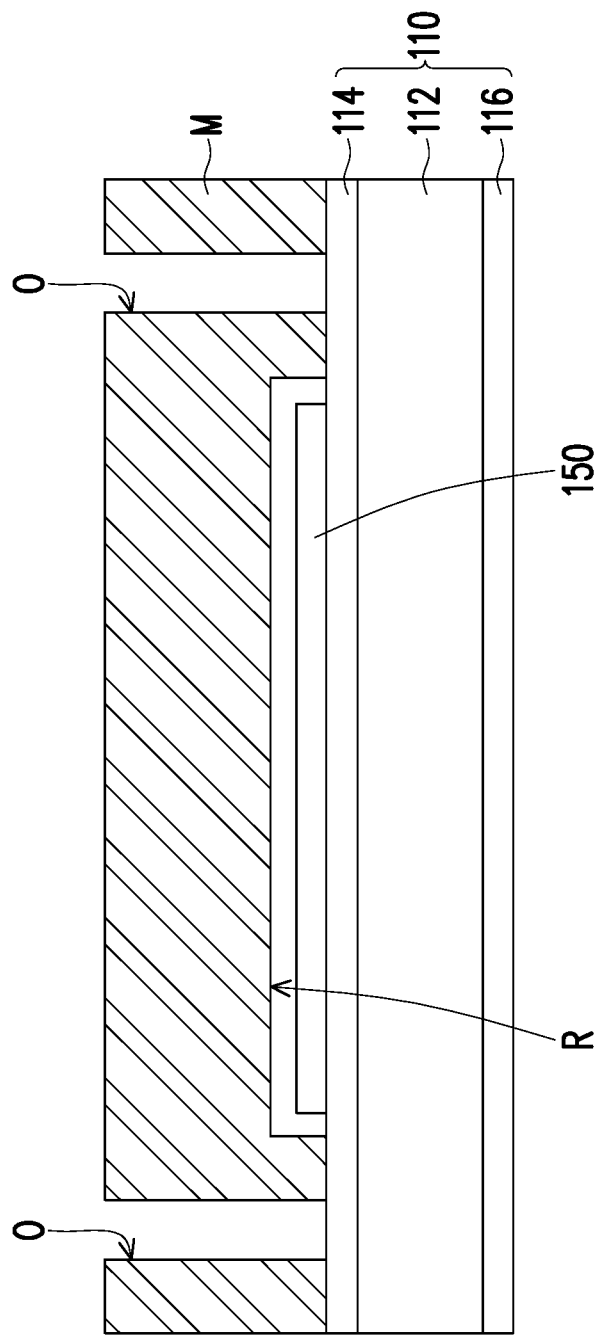

As shown in FIG. 3B, an auxiliary mask M may be produced on the top substrate 110. The auxiliary mask M presents a pattern including a plurality of openings O exposing the portion of the top substrate 110 where the sealing barrier 142 (shown in FIG. 3C) is going to be formed. In some embodiments, the auxiliary mask M is a pre-fabricated rigid mask including a recess R in a central region. When the mask M is placed on the top substrate 110, the recess R stays without touching the top alignment layer 150. In other words, the auxiliary mask M covers the top alignment layer 150 without making direct physical contact. In some other embodiments, the auxiliary mask M is a patterned photoresist layer produced through a sequence of deposition, lithography and etching.

Figure 3C:
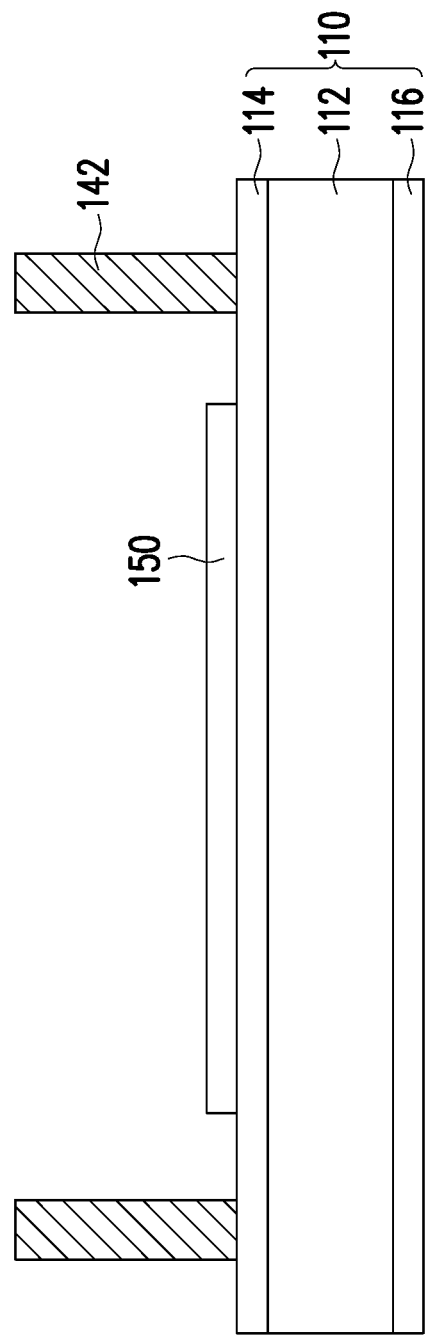

Referring to FIG. 3B and FIG. 3C simultaneously, the sealing barrier 142 is produced by filling the openings O of the auxiliary mask M with an inorganic material (not shown). In some embodiments, the inorganic material may be disposed via sputtering, thermal evaporation, chemical vapor deposition (CVD), atomic layer deposition (ALD) or the like, but the disclosure is not limited thereto, and alternative deposition techniques may also be used. When the sealing barrier 142 is a composite structure comprising a plurality of barrier layers, the steps just discussed with reference to FIG. 3B and FIG. 3C may be repeated as many times as required for the different barrier layers, using auxiliary masks (not shown) appropriately patterned.

Figure 3D:
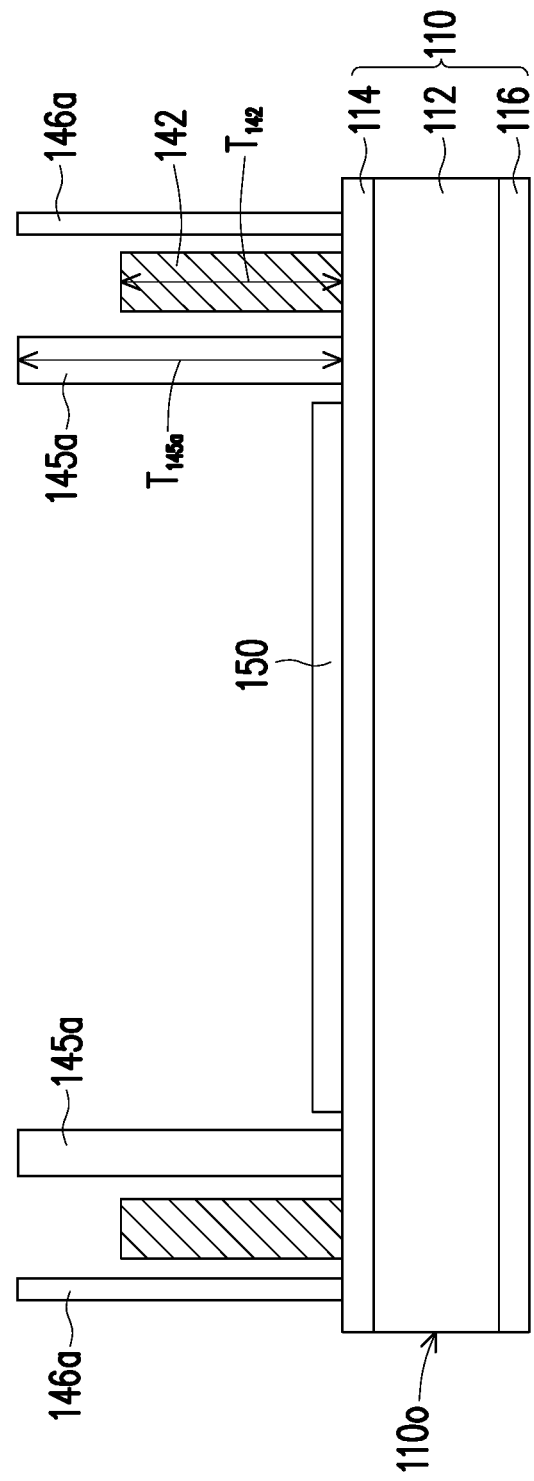

As shown in FIG. 3D, one or more portions of sealing material are dispensed on the top substrate 110. In some embodiments, an inner portion of sealing material 145$a$ is disposed between the top alignment layer 150 and the sealing barrier 142, and an outer portion of sealing material 146$a$ is disposed between the sealing barrier 142 and a side edge 110$o$ of the top substrate 110. After the inner portion of sealing material 145$a$ and the outer portion of sealing material 146$a$ are disposed on the top substrate 110, the sealing barrier 142 may not be in physical contact with either of the inner portion of sealing material 145a and the outer portion of sealing material 146a. In some embodiments, a thickness $T_{145a}$ of the inner portion of sealing material 145a may be greater than the thickness $T_{142}$ of the sealing barrier 142. In some embodiments, the sealing material may be provided by dispensing, screen printing or APR printing technology, but the disclosure is not limited thereto. The sealing material, though is not yet cured, has a certain viscosity to maintain the thickness without significantly spreading and extending outwardly, so that the sealing material may not physically contact the sealing barrier 142, but the disclosure is not limited thereto. In some alternative embodiments, the uncured sealing material may contact the sealing barrier 142.

Figure 3E:
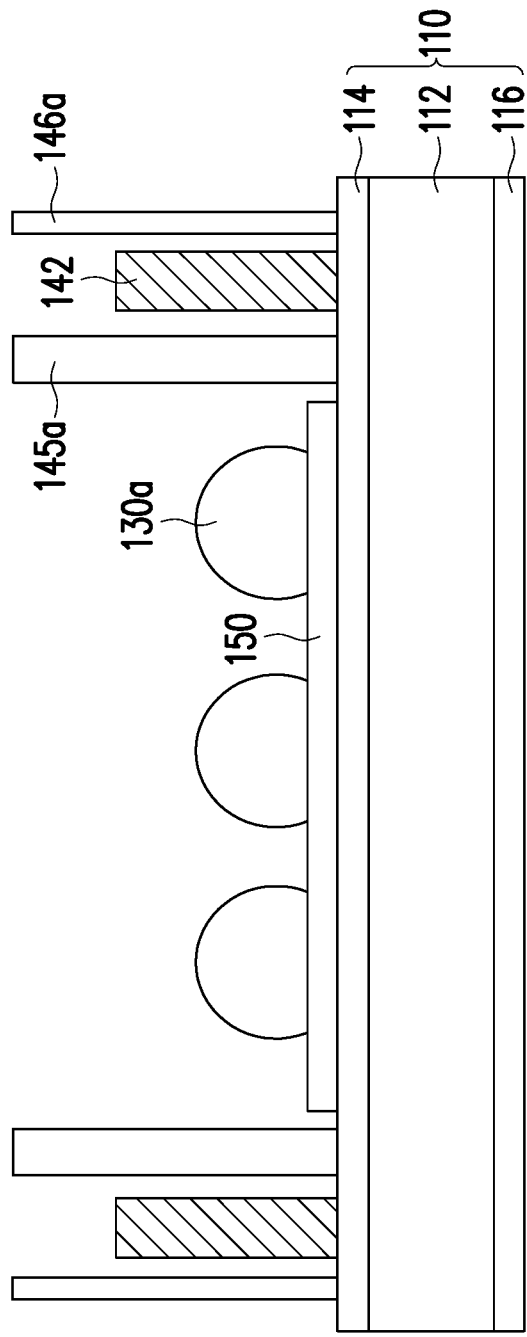
Figure 3F:
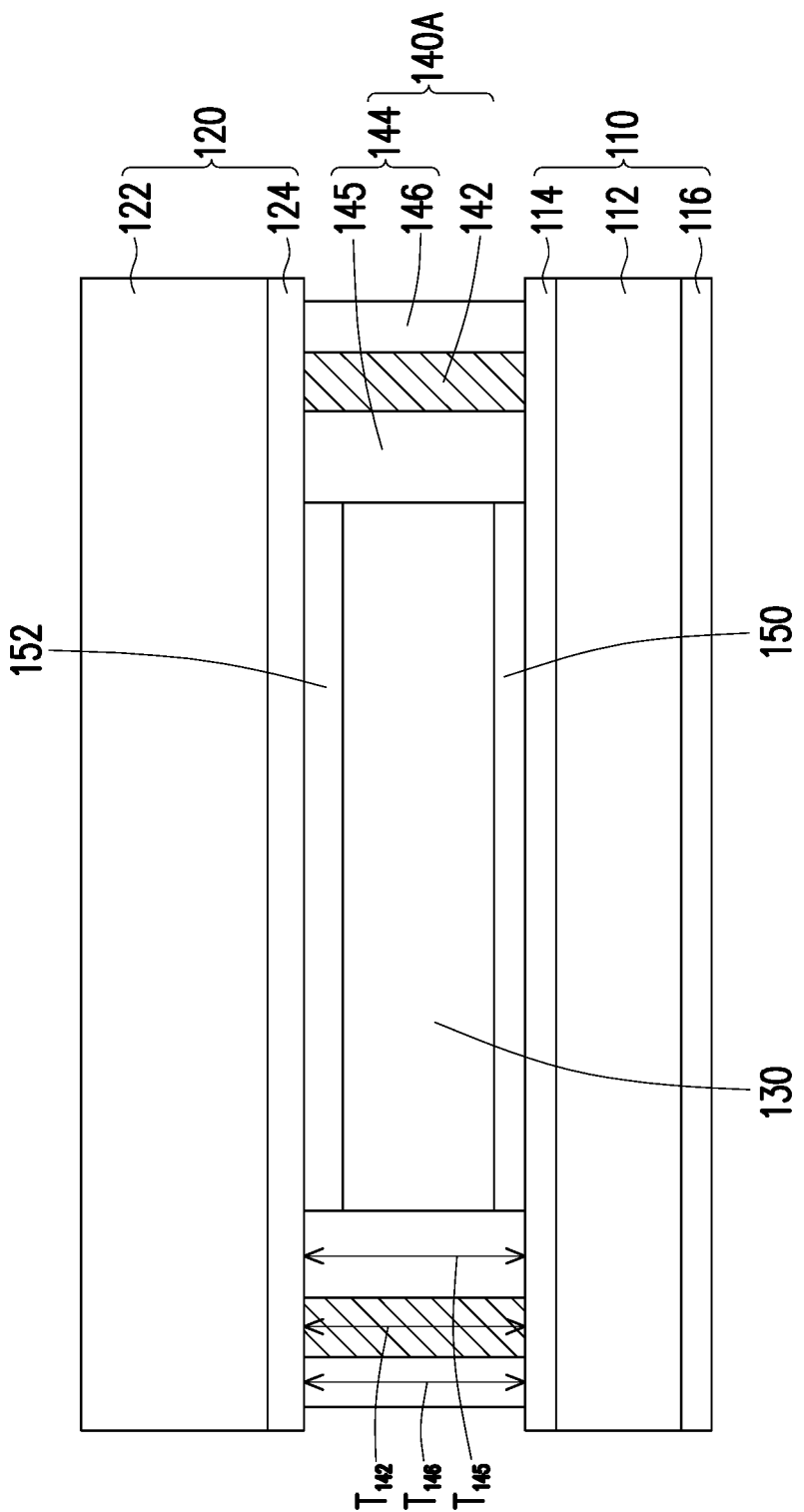

Referring to FIG. 3E and FIG. 3F, a display medium material 130a is dispensed on the top alignment layer 150 in the region surrounding by the inner portion of sealing material 145a of the sealing material, and after which the top substrate 110 is assembled with the bottom substrate 120 with a bottom alignment layer 152 formed thereon. The bottom alignment layer 152 may have been formed on the bottom substrate 120 before the assembling step with the top substrate 110. During the assembling step, the inner portion of sealing material 145a and the outer portion 146a of the sealing material may be compressed so that the inner portion of sealing material 145a may be shorten and widen to physically contact the sealing barrier 142 and the display medium material 130a may spread and substantially fill the entire space defined by the top substrate 110, the bottom substrate 120 and the inner portion of sealing material 145a. After assembling the bottom substrate 120 with the top substrate 110, a curing step may be performed to cure the compressed sealing material to form the sealing layer 144. In some embodiments, the sealing material may be a UV-curable sealant. In other words, an irradiation with a curing light having wavelength below about 400 nm (UV light) may be required. The curing light may have maximum intensity around 365 nm, depending on the material used for the sealing material. Alternatively, the sealing material may be mainly cured with UV light of wavelength of 365 nm. In some other embodiments, the sealing material may be cured by heat, and a baking step may be performed. The temperature and the duration of the baking step may be selected according to the sealing material used. Upon curing, the inner portion of sealing material 145a may form the inner sealing portion 145 of the sealing layer 144, and the outer portion of sealing material 146a may form the outer sealing portion 146 of the sealing layer 144. In some embodiments, after the assembly of the top substrate 110 with the bottom substrate 120 and the curing step, the thickness $T_{145}$ of the inner sealing portion 145, the thickness $T_{142}$ of the sealing barrier 142 and the thickness $T_{146}$ of the outer sealing portion 146 are substantially equal. Formation of the light shielding layer (160, shown in FIG. 1) on the top substrate 110, for example by ink-jet printing or super ink-jet printing, completes the display panel 100A shown in FIG. 1.

Whilst in the method just illustrated the sealing structure 140A was entirely formed on the top substrate 110, in some alternative embodiments individual elements of the sealing structure may be formed on either of the top substrate 110 and the bottom substrate 120, according to production and design requirements.

Figure 4A:
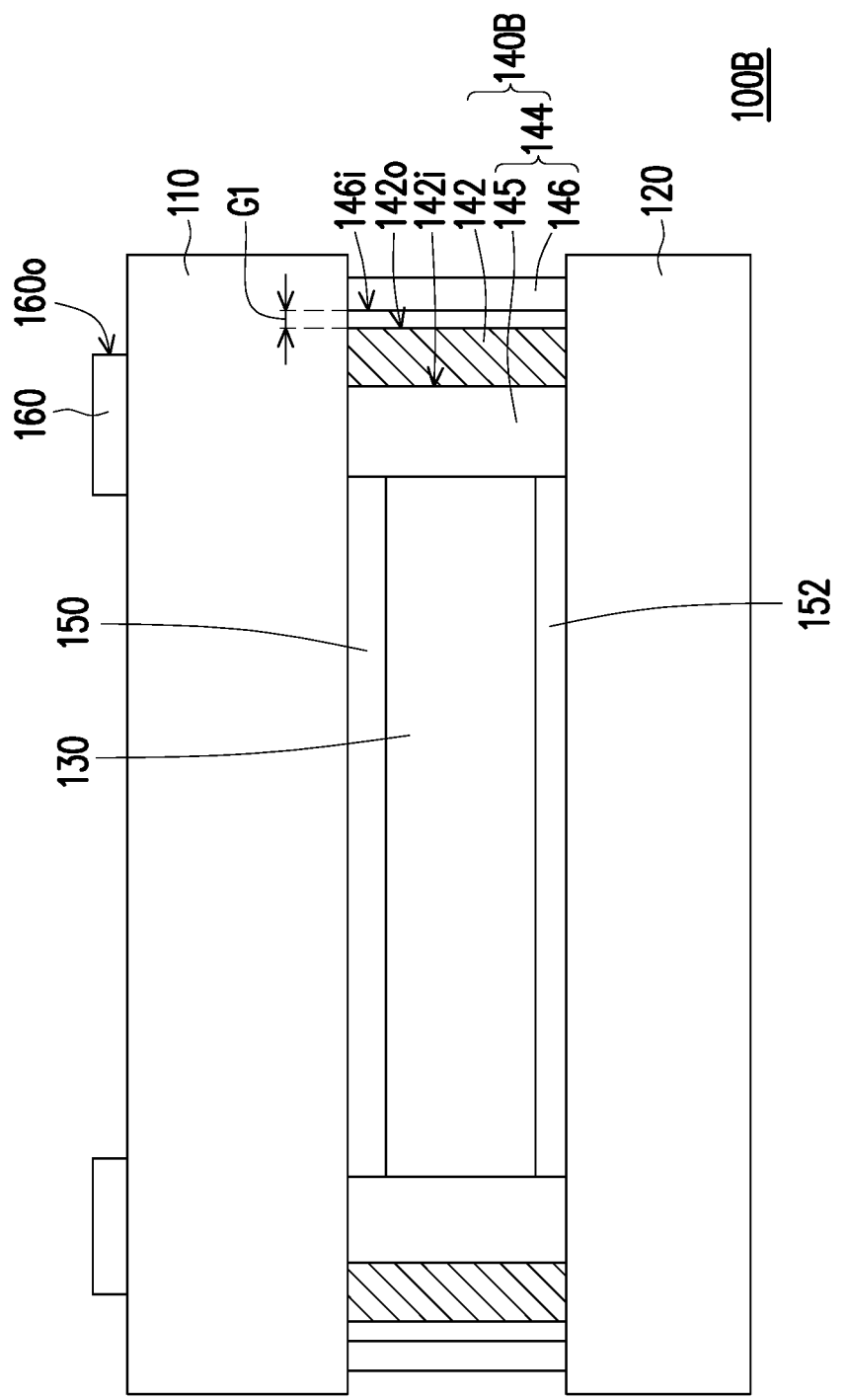
FIG. 4A to FIG. 4C show schematic cross-sectional views of display panels according to some embodiments of the present disclosure.

In FIG. 4A is shown a cross-sectional view of a display panel 100B according to another embodiment of the present disclosure. The structure of the display panel 100B shown in FIG. 4A may be an implementing example of an embodiment of the present disclosure. The display panel 100B shown in FIG. 4A is similar to the display panel 100A shown in FIG. 1, and the same or similar reference numbers in the two embodiments represent the same or similar elements or components. The display panel 100B may include the top substrate 110, the bottom substrate 120, the display medium layer 130, the sealing structure 140B, the top alignment layer 150, the bottom alignment layer 152, and the light shielding layer 160. The sealing structure 140B includes the sealing barrier 142 and the sealing layer 144. The sealing layer 144 includes the inner sealing portion 145 and the outer sealing portion 146. In the sealing structure 140B, a gap G1 separates the sealing barrier 142 and the outer sealing portion 146. That is, the outer edge 142o of the sealing barrier 142 further away from the display medium layer 130 is not in physical contact with an inner edge 146i of the outer sealing portion 146. The inclusion of the gap G1 between the outer sealing portion 146 and the sealing barrier 142 increases the distance that adventitious moisture or other contaminants have to cross to enter the display panel 100B and reach the display medium layer 130, thereby reducing and/or delaying the water vapor transmittance through the sealing structure 140B. Herein, the outer edge 160o of the light shielding layer 160 may be positioned between the inner edge 142i of the sealing barrier 142 and the outer edge 142o of the sealing barrier 142. In other words, the light shielding layer 160 may partially shield the sealing barrier 142, but the disclosure is not limited thereto.

Figure 4B:
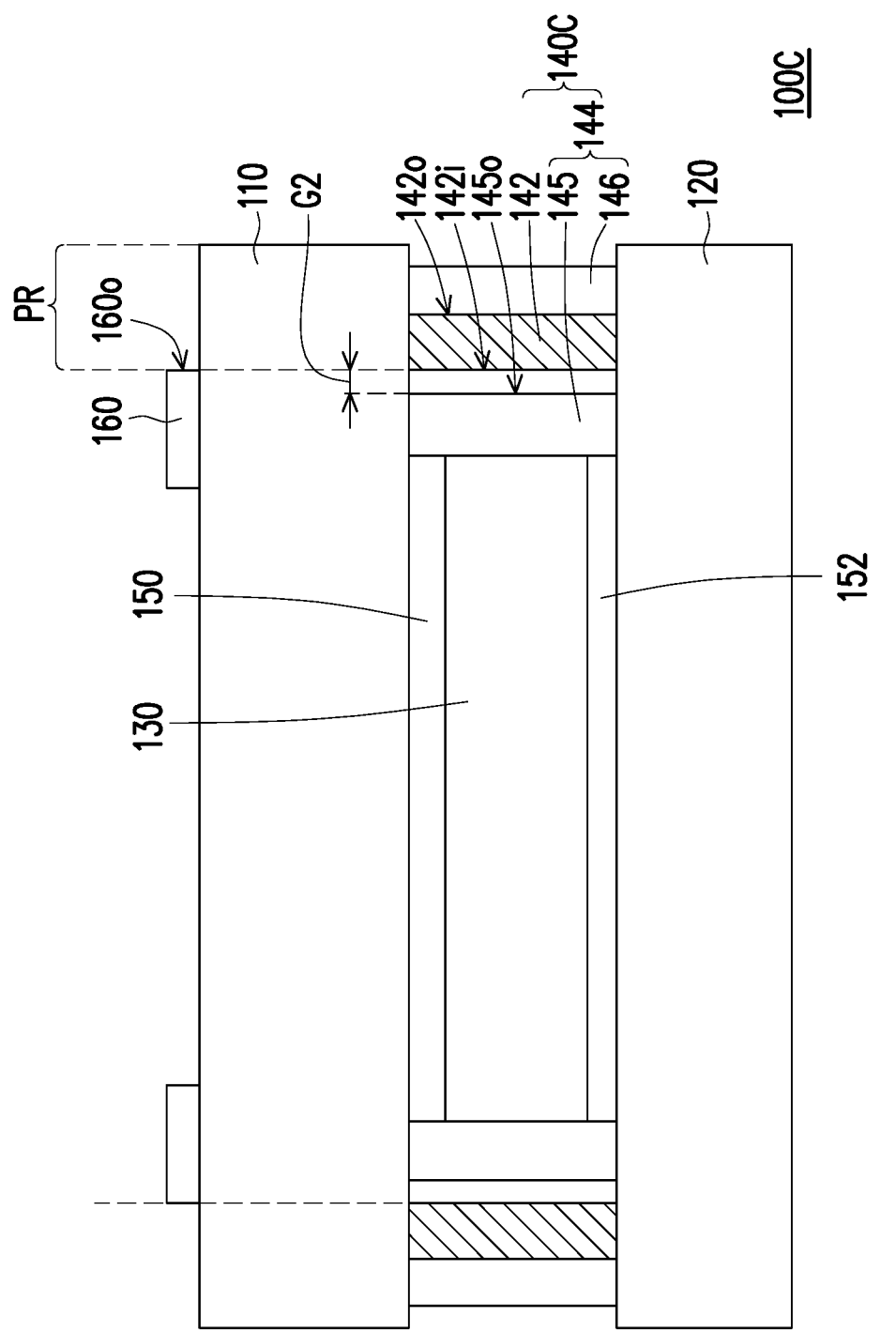

In FIG. 4B is shown a cross section of a display panel 100C according to another embodiment of the present disclosure. The structure of the display panel 100C shown in FIG. 4B may be an implementing example of an embodiment of the present disclosure. The display panel 100C shown in FIG. 4B is similar to the display panel 100A shown in FIG. 1, and the same or similar reference numbers in the two embodiments represent the same or similar elements or components. The display panel 100C may include the top substrate 110, the bottom substrate 120, the display medium layer 130, the sealing structure 140C, the top alignment layer 150, the bottom alignment layer 152, and the light shielding layer 160. The sealing structure 140C includes the sealing barrier 142 and the sealing layer 144. The sealing layer 144 includes the inner sealing portion 145 and the outer sealing portion 146. In the sealing structure 140C, a gap G2 separates the sealing barrier 142 and the inner sealing portion 145. That is, an outer edge 145o of the inner sealing portion 145 further away from the display medium layer 130 is not in physical contact with the inner edge 142i of the sealing barrier 142. The outer sealing portion 146 is in physical contact with the outer edge 142o of the sealing barrier 142. In the display panel 100C, the inner edge 142i of the sealing barrier 142 may be aligned with the outer edge 160o of the light shielding layer 160. In other words, in the display panel 100C the sealing barrier 142 lies entirely in the peripheral region PR. The inclusion of the gap G2 between the inner sealing portion 145 and the sealing barrier 142 increases the distance that adventitious moisture or other contaminants have to cross to enter the display panel 100C and reach the display medium layer 130, thereby reducing and/or delaying the water vapor transmittance through the sealing structure 140C.

Figure 4C:
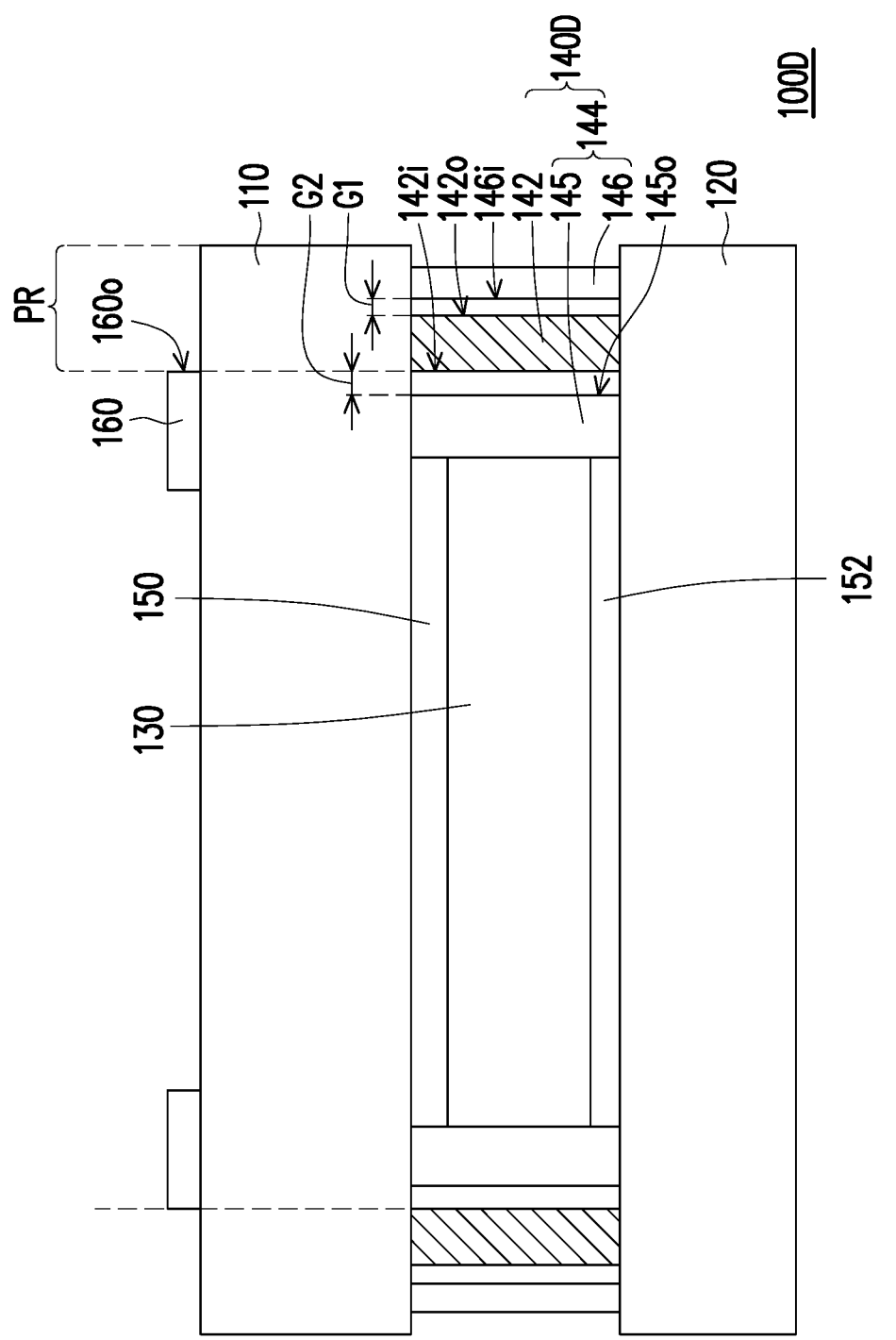

In FIG. 4C is shown a cross-sectional view of a display panel 100D according to another embodiment of the present disclosure. The structure of the display panel 100D shown in FIG. 4C may be an implementing example of an embodiment of the present disclosure. The display panel 100D shown in FIG. 4C is similar to the display panel 100A shown in FIG. 1, and the same or similar reference numbers in the two embodiments represent the same or similar elements or components. The display panel 100D may include the top substrate 110, the bottom substrate 120, the display medium layer 130, the sealing structure 140D, the top alignment layer 150, the bottom alignment layer 152, and the light shielding layer 160. The sealing structure 140D includes the sealing barrier 142 and the sealing layer 144. The sealing layer 144 includes the inner sealing portion 145 and the outer sealing portion 146. In the sealing structure 140D, the gap G1 separates the sealing barrier 142 from the outer sealing portion 146 and the gap G2 separates the sealing barrier 142 and the inner sealing portion 145. In other words, the gaps G1 and G2 separate the sealing barrier 142 from the sealing layer 144. That is, the inner edge 142i is not in contact with the outer edge 145o of the inner sealing portion 145, and neither the outer edge 142o of the sealing barrier 142 is in contact with the inner edge 146i of the outer sealing portion 146. As in the display panel 100C, the inner edge 142i of the sealing barrier 142 in the display 100D is aligned with the outer edge 160o of the light shielding layer 160. As such, the sealing barrier 142 lies entirely in the peripheral region PR of the display panel 100D. The inclusion of the gaps G1 and G2 between the sealing layer 144 and the sealing barrier 142 increases the distance that adventitious moisture or other contaminants have to travel to enter the display panel 100D and reach the display medium layer 130, thereby reducing and/or delaying the water vapor transmittance through the sealing structure 140D. In addition, the water vapor transmittance rate of the sealing barrier 142 may be smaller than the water vapor transmittance rate of the sealing layer 144, which further prohibits the water vapor from reaching the display medium layer 130.

Figure 5:
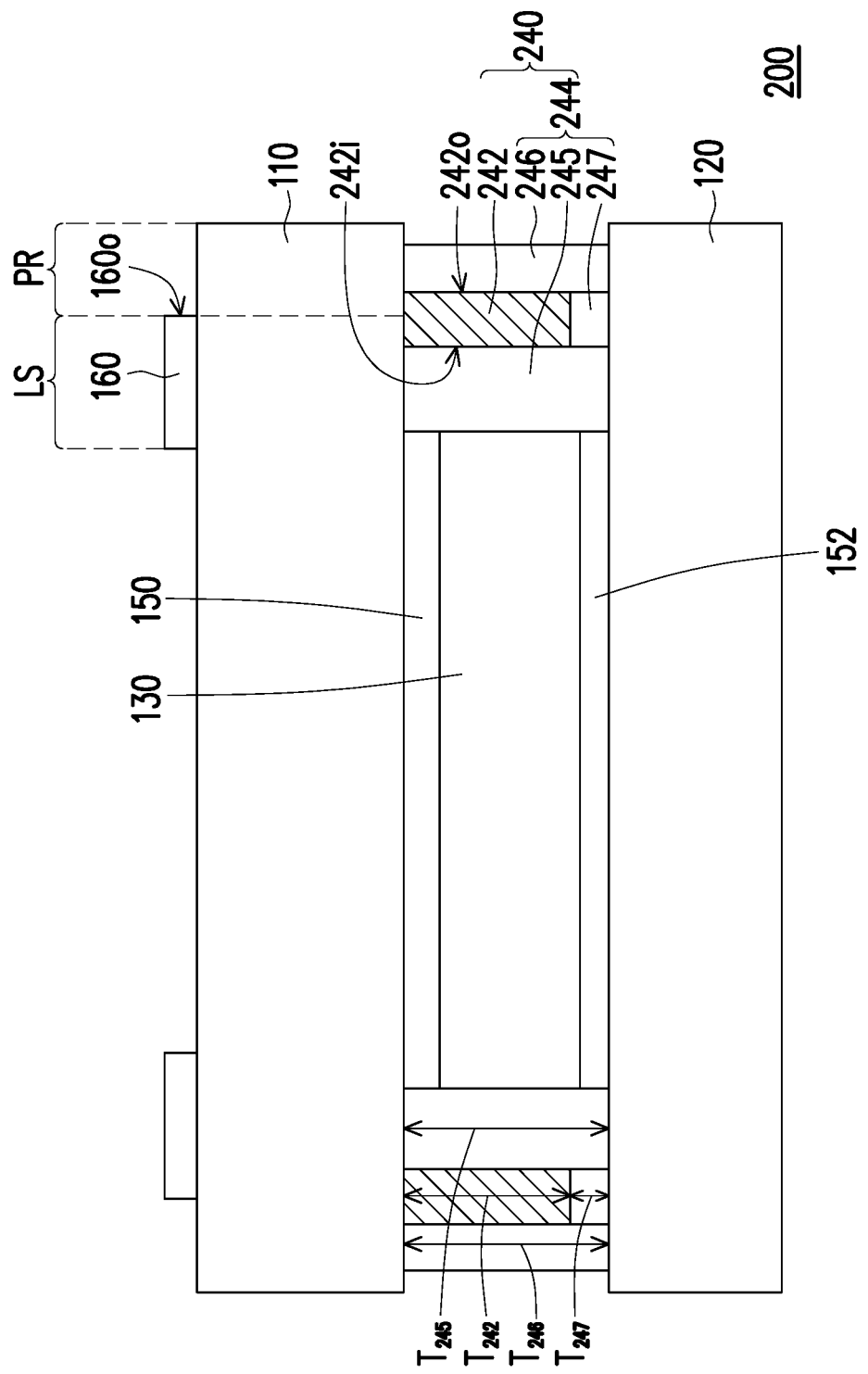
FIG. 5 shows a schematic cross-sectional view of a display panel according to an embodiment of the present disclosure.
Figure 6:
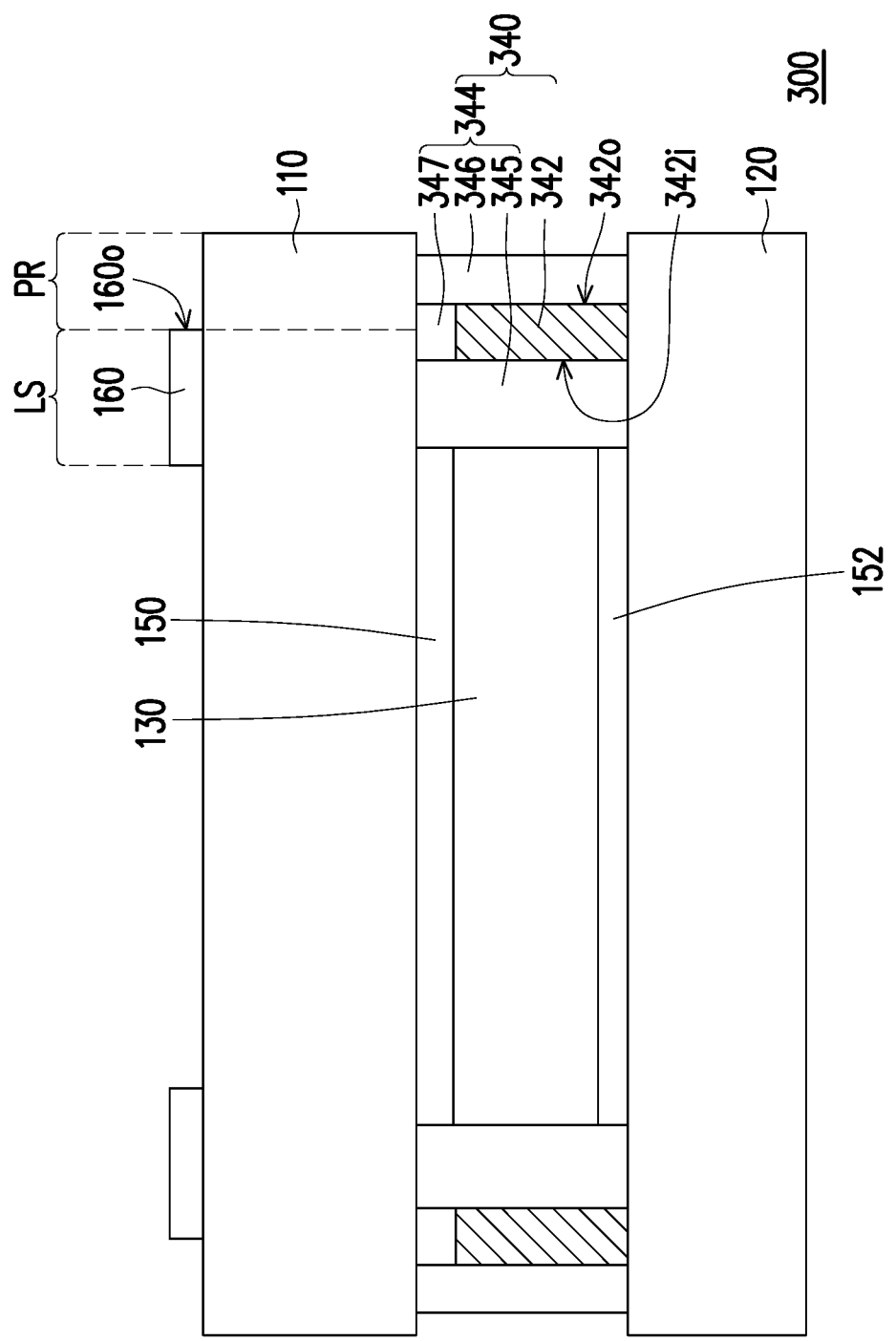
FIG. 6 shows a schematic cross-sectional view of a display panel according to an embodiment of the present disclosure.

In FIG. 5 and in FIG. 6 are shown the cross-sectional views of two display panels 200 and 300, respectively, according to other embodiments of the present disclosure. The structure of the display panel 200 shown in FIG. 5 or the structure of the display panel 300 shown in FIG. 6 may respectively be an implementing example of an embodiment of the present disclosure. Each of the display panel 200 shown in FIG. 5 and the display panel 300 shown in FIG. 6 is similar to the display panel 100A shown in FIG. 1, and the same or similar reference numbers in the respective drawings represent the same or similar elements or components. The display panel 200 may include the top substrate 110, the bottom substrate 120, the display medium layer 130, the sealing structure 240, the top alignment layer 150, the bottom alignment layer 152, and the light shielding layer 160. The sealing structure 240 includes the sealing barrier 242 and the sealing layer 244. The sealing layer 244 includes the inner sealing portion 245, the outer sealing portion 246, and a complemental sealing portion 247. In the sealing structure 240 the thickness $T_{242}$ of the sealing barrier 242 is less than the thickness $T_{245}$ of the inner sealing portion 245 or the thickness $T_{246}$ of the outer sealing portion 246. In other words, whilst the inner sealing portion 245 and the outer sealing portion 246 contact both the top substrate 110 and the bottom substrate 120, in the display panel 200, the sealing barrier 242 contacts only the top substrate 110. The complemental sealing portion 247 is disposed in contact with the sealing barrier 242, filling the gap between the sealing barrier 242 and the bottom substrate 120. In other words, the complemental sealing portion 247 may be disposed between the sealing barrier 242 and the bottom substrate 120. A vertical projection of the sealing barrier 242 on the top substrate 110 or on the bottom substrate 120 overlays a vertical projection of the complemental sealing portion 247 on the same substrate. A sum of the thickness $T_{242}$ of the sealing barrier 242 and a thickness $T_{247}$ of the complemental sealing portion 247 equals the thickness $T_{245}$ of the inner sealing portion 245 or the thickness $T_{246}$ of the outer sealing portion 246.

The display panel 300 shown in FIG. 6 may include the top substrate 110, the bottom substrate 120, the display medium layer 130, the sealing structure 340, the top alignment layer 150, the bottom alignment layer 152, and the light shielding layer 160. The structure of the display panel 300 is similar to the display panel 200 and the difference of the display panel 300 from the display panel 200 lies in that the sealing structure 340 includes the sealing barrier 342 and the sealing layer 344. As shown in FIG. 6, the sealing barrier 342 contacts only the bottom substrate 120 and keeps a gap from the top substrate 110. The complemental sealing portion 347 is disposed in contact with the sealing barrier 342, filling the gap between the sealing barrier 342 and the top substrate 110. In other words, the complemental sealing portion 347 may be disposed between the sealing barrier 342 and the top substrate 110.

It should be noted that whilst in FIG. 5 (FIG. 6) the sealing barrier 242 (342) is shown to physically contact the sealing layer 244 (344), a gap (not shown) may separate the sealing barrier 242 (342) from one or both of the inner sealing portion 245 (345) and the outer sealing portion 246 (346), similarly to what is discussed for the display panels 100B, 100C and 100D of FIG. 4A to FIG. 4C. As such, in some embodiments, the sealing barrier 242 (342) and the complemental sealing portion 247 (347) may be partially located in the light shielding region LS, with the remaining part being located in the peripheral region PR. In some embodiments, a vertical projection of the outer edge 160o of the light shielding layer 160 falls between the inner edge 242i (342i) and the outer edge 242o (342o) of the sealing barrier 242 (342). In some alternative embodiments (not shown), the sealing barrier 242 (342) and the complemental sealing portion 247 (347) may be entirely located in the peripheral region PR. In some embodiments, the inner edge 242i (342i) may be aligned with the outer edge 160o of the light shielding layer 160.

Figure 7:
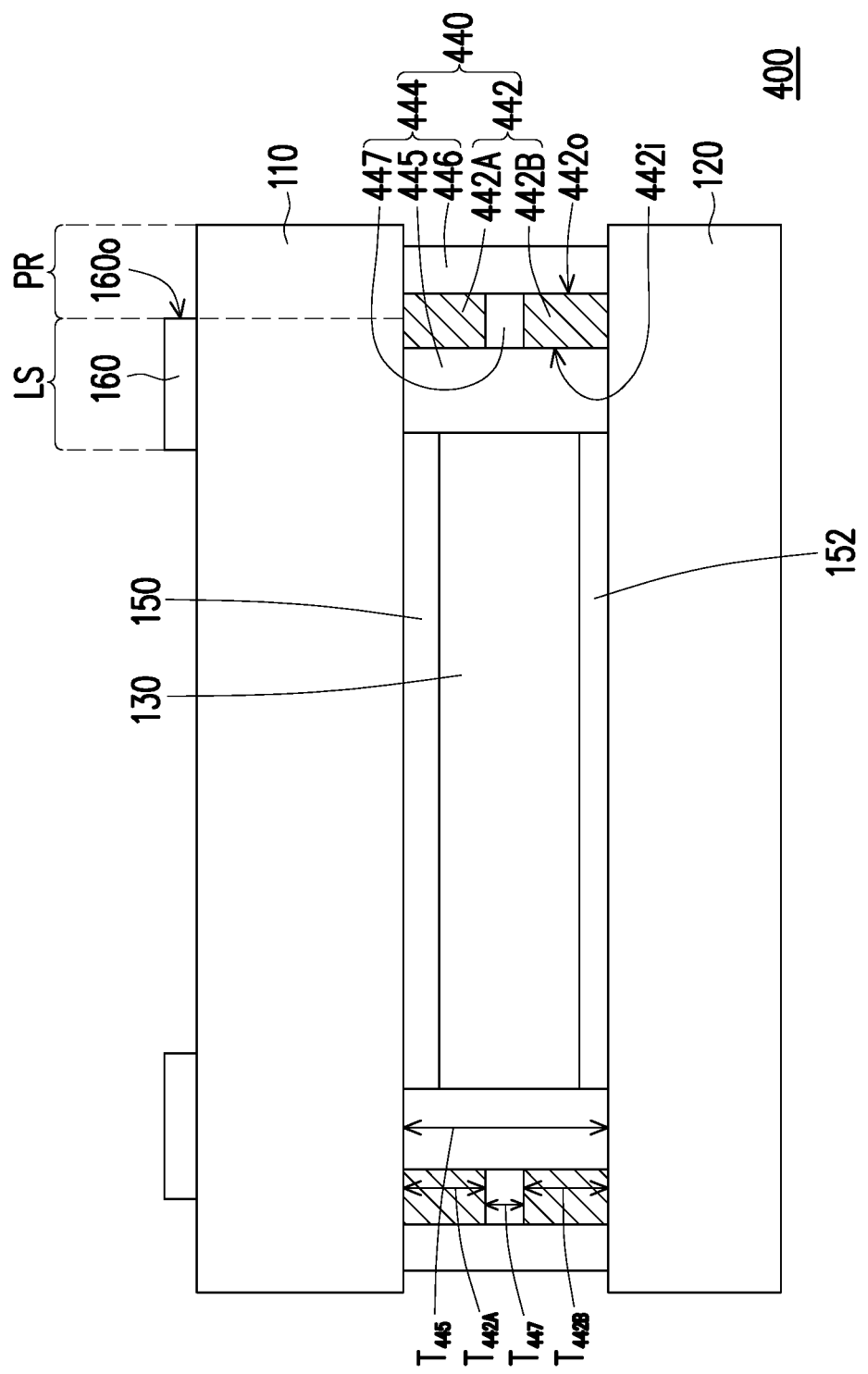
FIG. 7 shows a schematic cross-sectional view of a display panel according to an embodiment of the present disclosure.

In FIG. 7 is shown a cross-sectional view of a display panel 400, according to another embodiment of the present disclosure. The structure of the display panel 400 shown in FIG. 7 may be an implementing example of an embodiment of the present disclosure. The display panel 400 shown in FIG. 7 is similar to the display panel 200 (300) shown in FIG. 5 (FIG. 6), and the same or similar reference numbers in the two embodiments represent the same or similar elements or components. The display panel 400 may include the top substrate 110, the bottom substrate 120, the display medium layer 130, the sealing structure 440, the top alignment layer 150, the bottom alignment layer 152, and the light shielding layer 160. The sealing structure 440 includes the sealing barrier 442 and the sealing layer 444. The sealing barrier 442 includes a first barrier portion 442A and a second barrier portion 442B. The sealing layer 444 includes the inner sealing portion 445, the outer sealing portion 446, and the complemental sealing portion 447. In some embodiments, the complemental sealing portion 447 is disposed between the first barrier portion 442A and the second barrier portion 442B. That is, the first barrier portion 442A, the complemental sealing portion 447 and the second barrier portion 442B may be vertically stacked in this order moving from the top substrate 110 to the bottom substrate 120. A vertical projection of the first bather portion 442A on the top substrate 110 or on the bottom substrate 120 overlays a vertical projection of the complemental sealing portion 447 and a vertical projection of the second barrier portion 442B. In the sealing structure 440, the first barrier portion 442A is in contact with the top substrate 110, whilst the second barrier portion 442B is in contact with the bottom substrate 120. The sum of a thickness $T_{442A}$ of the first barrier portion 442A, a thickness $T_{442B}$ of the second barrier portion 442B and the thickness $T_{447}$ of the complemental sealing portion 447 equals the thickness $T_{445}$ of the inner sealing portion 445.

It should be noted that whilst in FIG. 7 the sealing barrier 442 is shown to physically contact the inner sealing portion 445 and the outer sealing portion 446, in some embodiments a gap (not shown) may separate the sealing barrier 442 from one or both of the inner sealing portion 445 and the outer sealing portion 446, similarly to what is discussed for the display panels 100B, 100C and 100D of FIG. 4A to FIG. 4C. As such, in some embodiments, the sealing barrier 442 and the complemental sealing portion 447 may be partially located in the light shielding region LS, with the remaining part being located in the peripheral region PR. In some embodiments, a vertical projection of the outer edge 160o of the light shielding layer 160 falls in between the inner edge 442i and the outer edge 442o of the sealing barrier 442. In some alternative embodiments (not shown), the sealing barrier 442 and the complemental sealing portion 447 may be entirely located in the peripheral region PR. In some embodiments, the outer edge 160o of the light shielding layer may be aligned with the inner edge 442i of the sealing barrier 442.

Figure 8A:
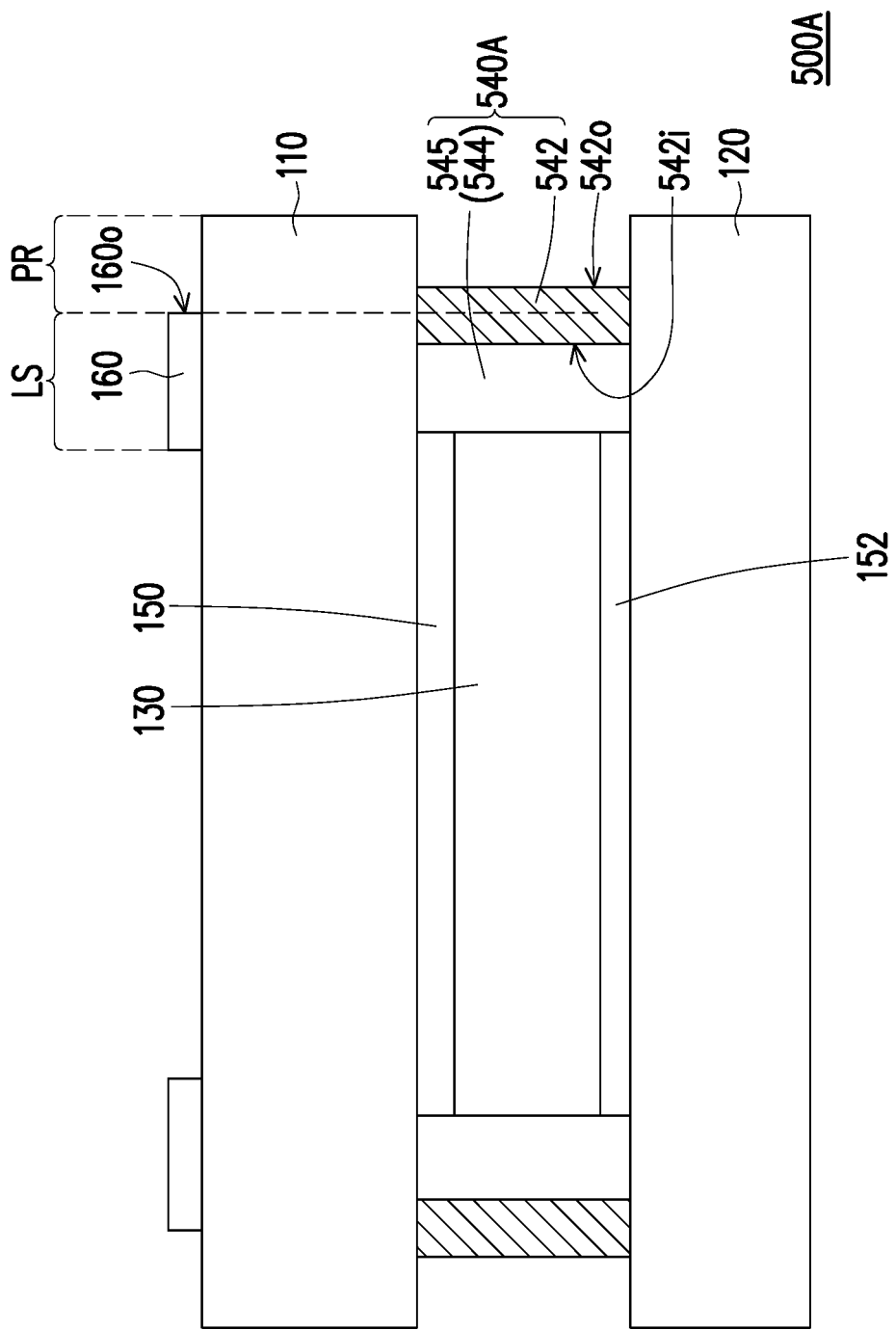
FIG. 8A to FIG. 8D show schematic cross-sectional views of display panels according to some embodiments of the present disclosure.

In FIG. 8A is shown a cross-sectional view of a display panel 500A according to another embodiment of the present disclosure. The structure of the display panel 500A shown in FIG. 8A may be an implementing example of an embodiment of the present disclosure. The display panel 500A shown in FIG. 8A is similar to the display panel 100A shown in FIG. 1, and the same or similar reference numbers in the two embodiments represent the same or similar elements or components. The display panel 500A may include the top substrate 110, the bottom substrate 120, the display medium layer 130, the sealing structure 540A, the top alignment layer 150, the bottom alignment layer 152, and the light shielding layer 160. The sealing structure 540A includes the sealing barrier 542 and the sealing layer 544. A difference between the display panel 500A of FIG. 8A and the display panel 100A of FIG. 1 is that in the sealing structure 540A, the sealing layer 544 includes only the inner sealing portion 545, without including the outer sealing portion shown in FIG. 1. In other words, the outer edge 542o of the sealing barrier 542 may be exposed without being covered by a portion of the sealing layer 544. As in display panel 100A of FIG. 1, a vertical projection of the outer edge 160o of the light shielding layer 160 falls on the sealing barrier 542, between the inner edge 542i and the outer edge 542o of the sealing barrier 542. In other words, a portion of the sealing barrier 542 lies in the light shielding region LS, whilst the remaining portion lies in the peripheral region PR.

Figure 8B:
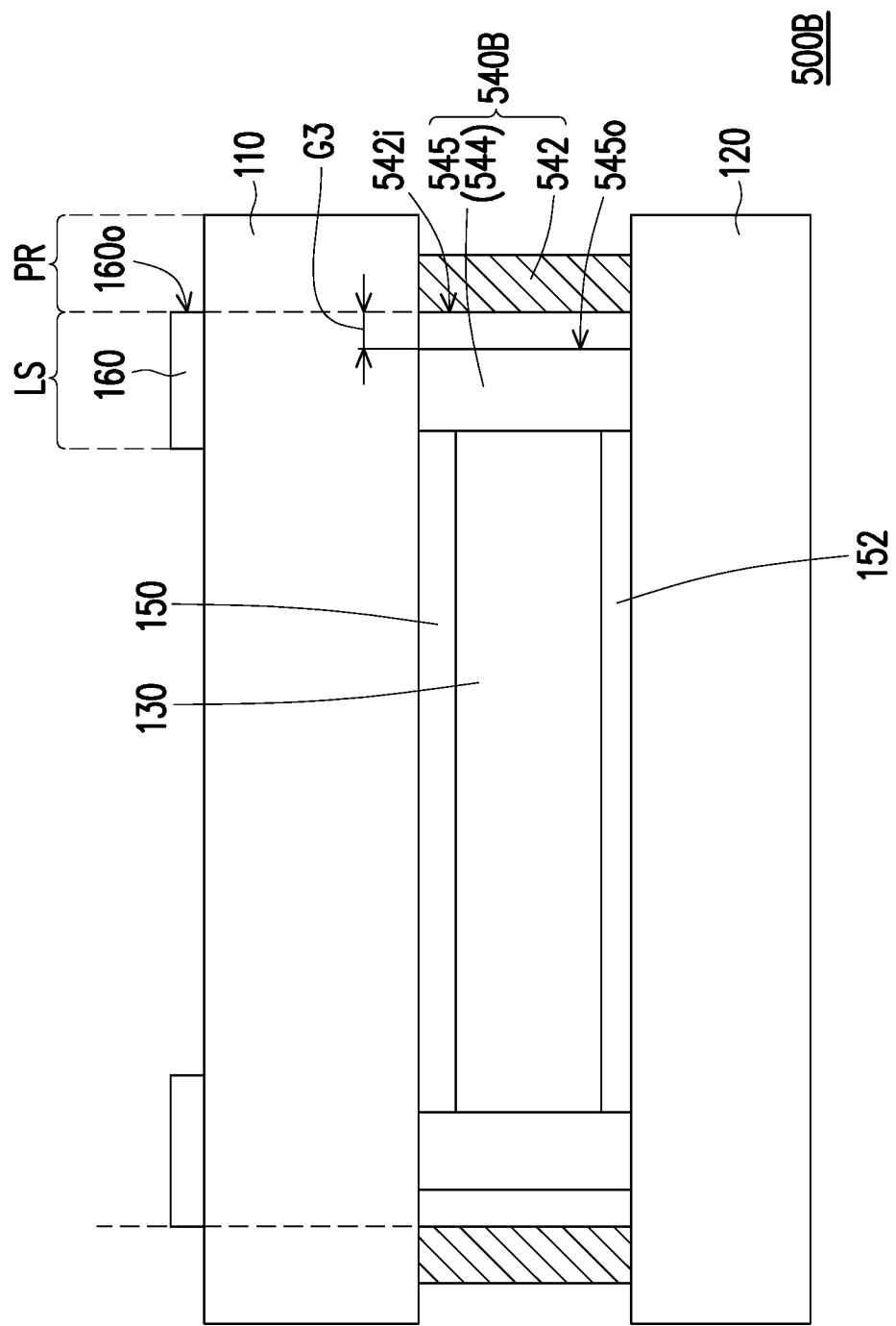

In FIG. 8B is shown a cross-sectional view of a display panel 500B according to another embodiment of the present disclosure. The structure of the display panel 500B shown in FIG. 8B may be an implementing example of an embodiment of the present disclosure. The display panel 500B shown in FIG. 8B is similar to the display panel 500A shown in FIG. 8A, and the same or similar reference numbers in the two embodiments represent the same or similar elements or components. The display panel 500B may include the top substrate 110, the bottom substrate 120, the display medium layer 130, the sealing structure 540B, the top alignment layer 150, the bottom alignment layer 152, and the light shielding layer 160. The sealing structure 540B includes the sealing barrier 542 and the sealing layer 544. As in display panel 500A, the sealing layer 544 of display panel 500B includes only the inner sealing portion 545 disposed between the sealing barrier 542 and the display medium layer 130. In the sealing structure 540B a gap G3 separates the sealing barrier 542 and the inner sealing portion 545. That is, the inner edge 542i of the sealing barrier 542 closer to the display medium layer 130 is not in physical contact with the outer edge 545o of the inner sealing portion 545. In some embodiments, the inner edge 542i of the sealing barrier 542 is aligned with the outer edge 160o of the light shielding layer 160. The inclusion of the gap G3 between the inner sealing portion 545 and the sealing barrier 542 increases the distance that adventitious moisture or other contaminants have to cross to enter the display panel 500B and reach the display medium layer 130, thereby reducing and/or delaying the water vapor transmittance through the sealing structure 540B.

Figure 8C:
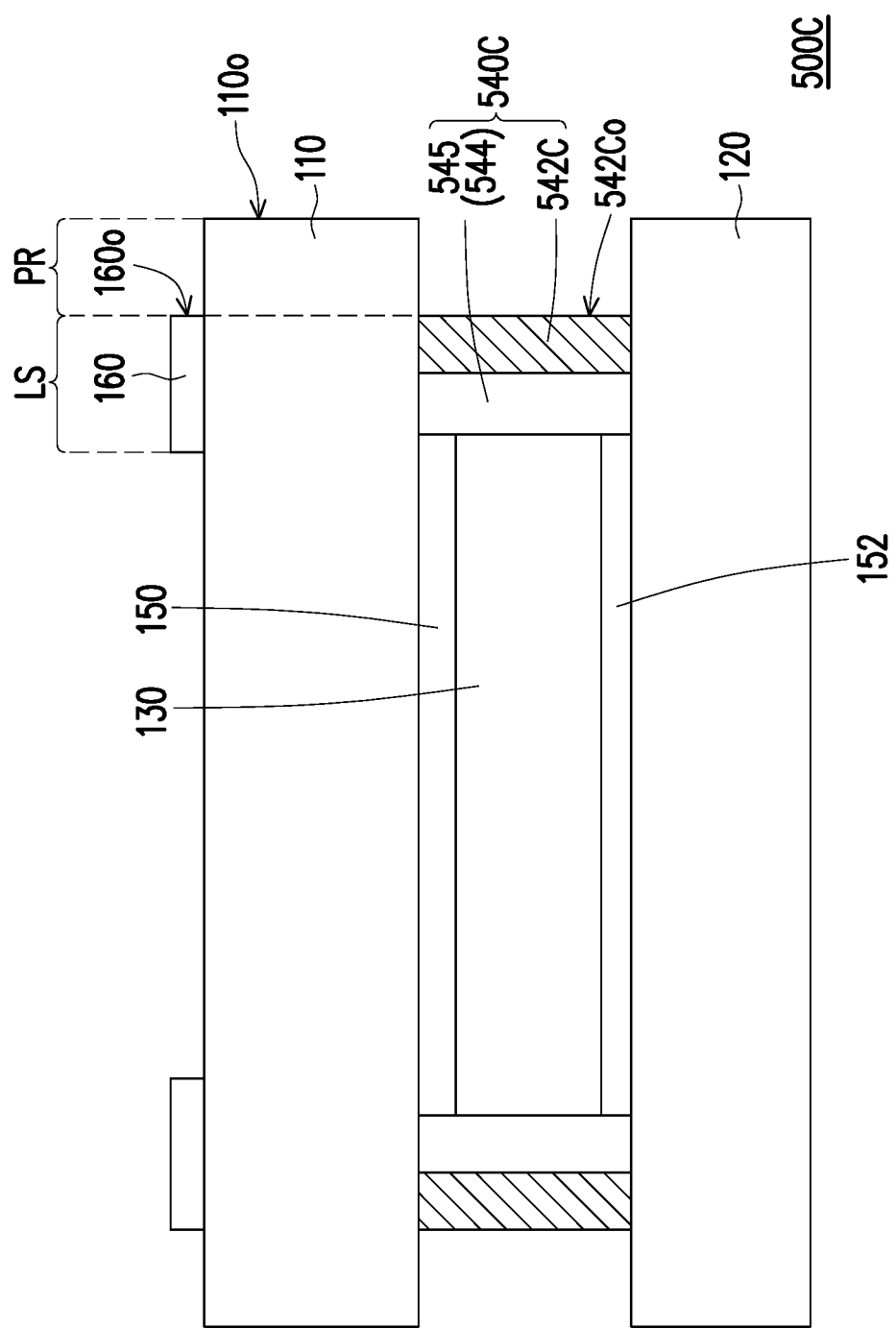

In FIG. 8C is shown a cross-sectional view of a display panel 500C according to another embodiment of the present disclosure. The structure of the display panel 500C shown in FIG. 8C may be an implementing example of an embodiment of the present disclosure. The display panel 500C shown in FIG. 8C is similar to the display panel 500A shown in FIG. 8A, and the same or similar reference numbers in the two embodiments represent the same or similar elements or components. The display panel 500C may include the top substrate 110, the bottom substrate 120, the display medium layer 130, the sealing structure 540C, the top alignment layer 150, the bottom alignment layer 152, and the light shielding layer 160. The sealing structure 540C includes the sealing barrier 542C and the sealing layer 544. As in display panel 500A, in display panel 500C the sealing layer 544 includes only the inner sealing portion 545 disposed between the sealing barrier 542C and the display medium layer 130. In the sealing structure 540C the sealing barrier 542C is entirely disposed within the light shielding region LS. That is, the outer edge 542Co of the sealing barrier 542C further away from the display medium layer 130 is aligned with the outer edge 160o of the light shielding layer 160. Whilst FIG. 8C shows the display panel 500C as including the peripheral region PR, in some alternative embodiments the peripheral region PR can be removed, so that a side edge 110o of the top substrate 110 is aligned with the outer edge 542Co of the sealing barrier 542C and the outer edge 160o of the light shielding layer 160.

Figure 8D:
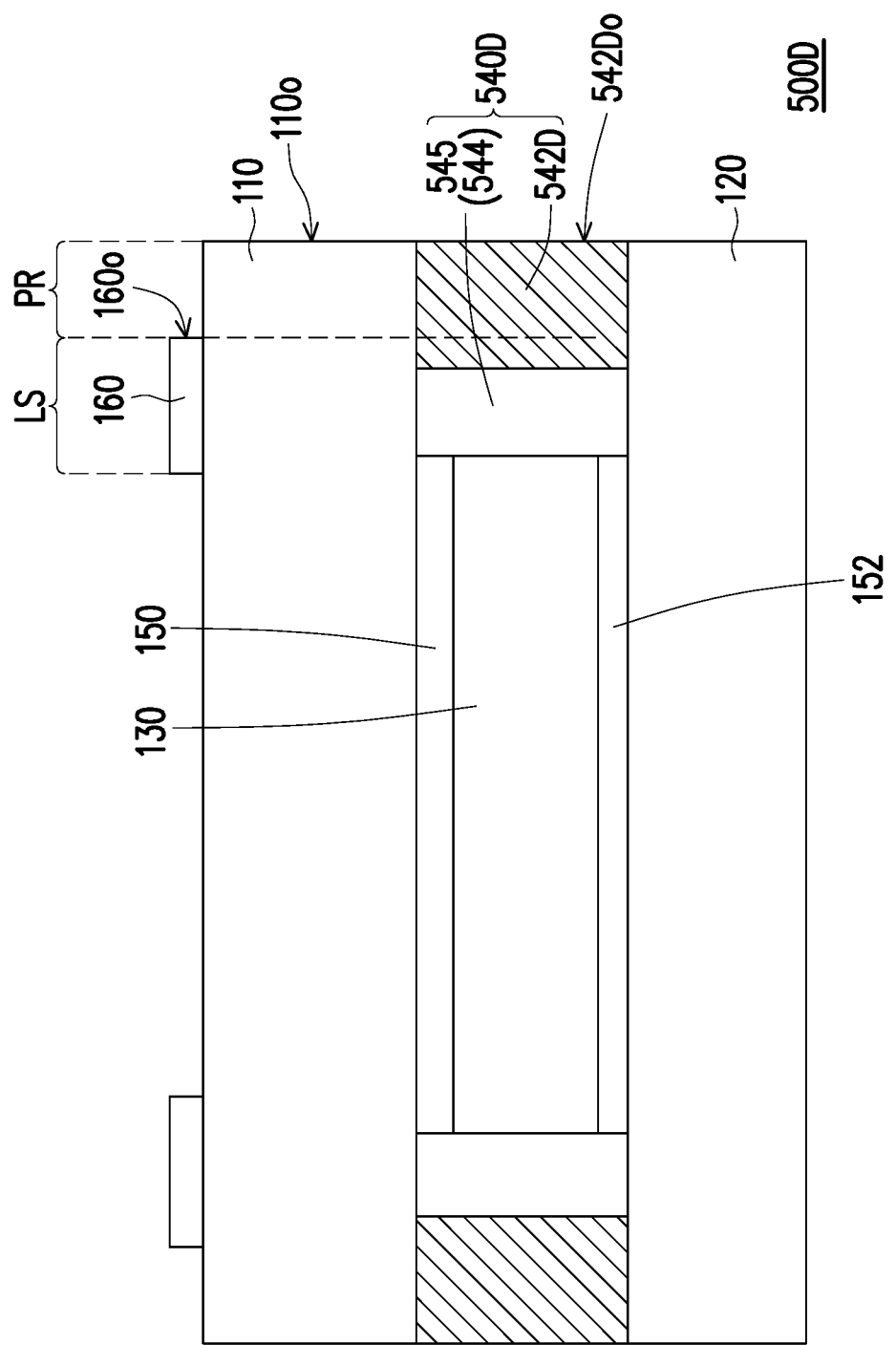

In FIG. 8D is shown a cross-sectional view of a display panel 500D according to another embodiment of the present disclosure. The structure of the display panel 500D shown in FIG. 8D may be an implementing example of an embodiment of the present disclosure. The display panel 500D shown in FIG. 8D is similar to the display panel 500A shown in FIG. 8A, and the same or similar reference numbers in the two embodiments represent the same or similar elements or components. The display panel 500D may include the top substrate 110, the bottom substrate 120, the display medium layer 130, the sealing structure 540D, the top alignment layer 150, the bottom alignment layer 152, and the light shielding layer 160. The sealing structure 540D includes the sealing barrier 542D and the sealing layer 544. As in display panel 500A, the sealing layer 544 of display panel 500D includes only the inner sealing portion 545 disposed between the sealing barrier 542D and the display medium layer 130. In the sealing structure 540D, part of the sealing barrier 542D is disposed within the light shielding region LS, whilst the remaining part of the sealing barrier 542D entirely fills the peripheral region PR in between the top substrate 110 and the bottom substrate 120. That is, the outer edge 542Do of the sealing barrier 542D further away from the display medium layer 130 is aligned with the side edge 110o of the top substrate 110, whilst a vertical projection of the outer edge 160o of the light shielding layer 160 falls on the sealing barrier 542D.

Figure 9:
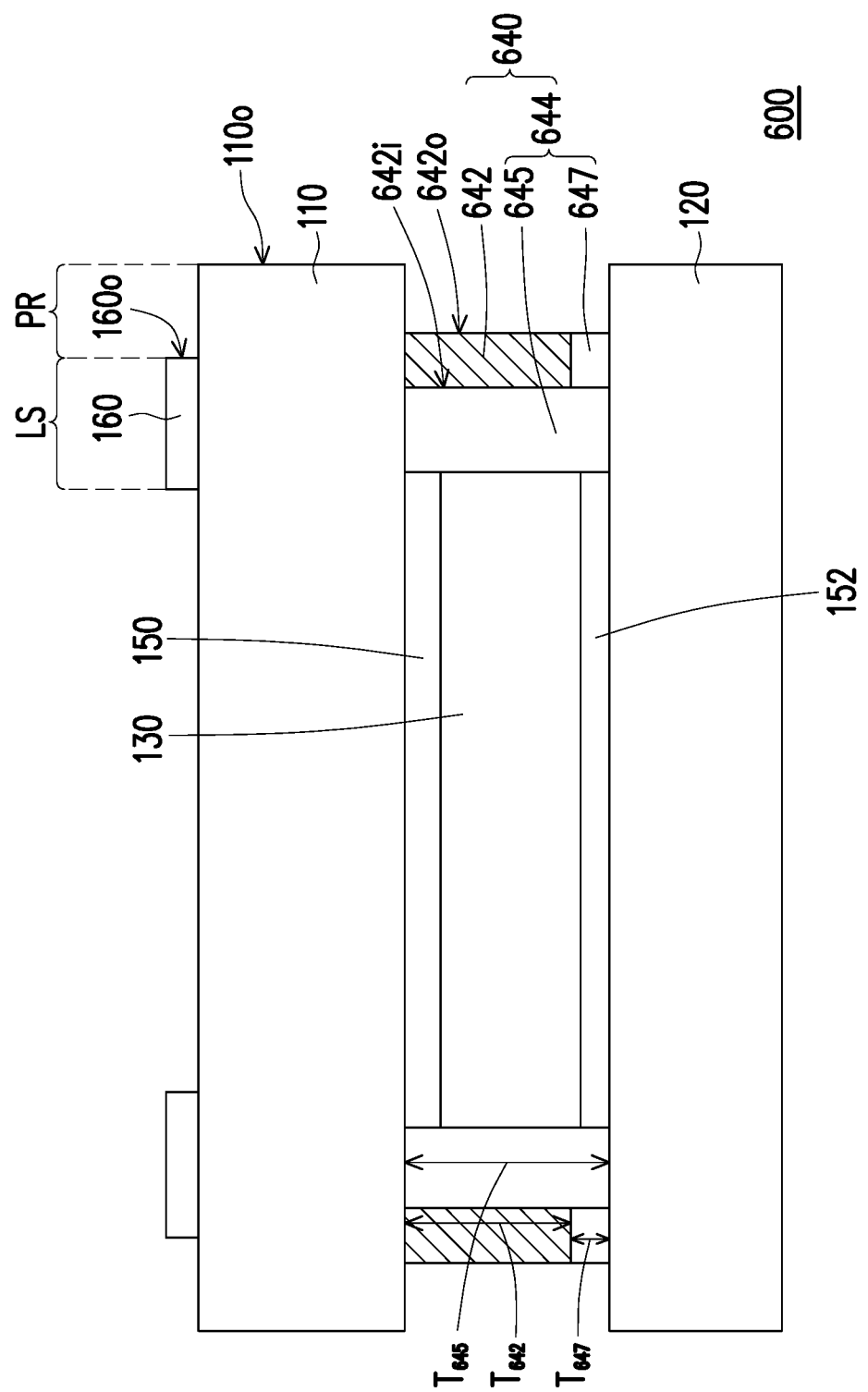
FIG. 9 shows a schematic cross-sectional view of a display panel according to an embodiment of the present disclosure.
Figure 10:
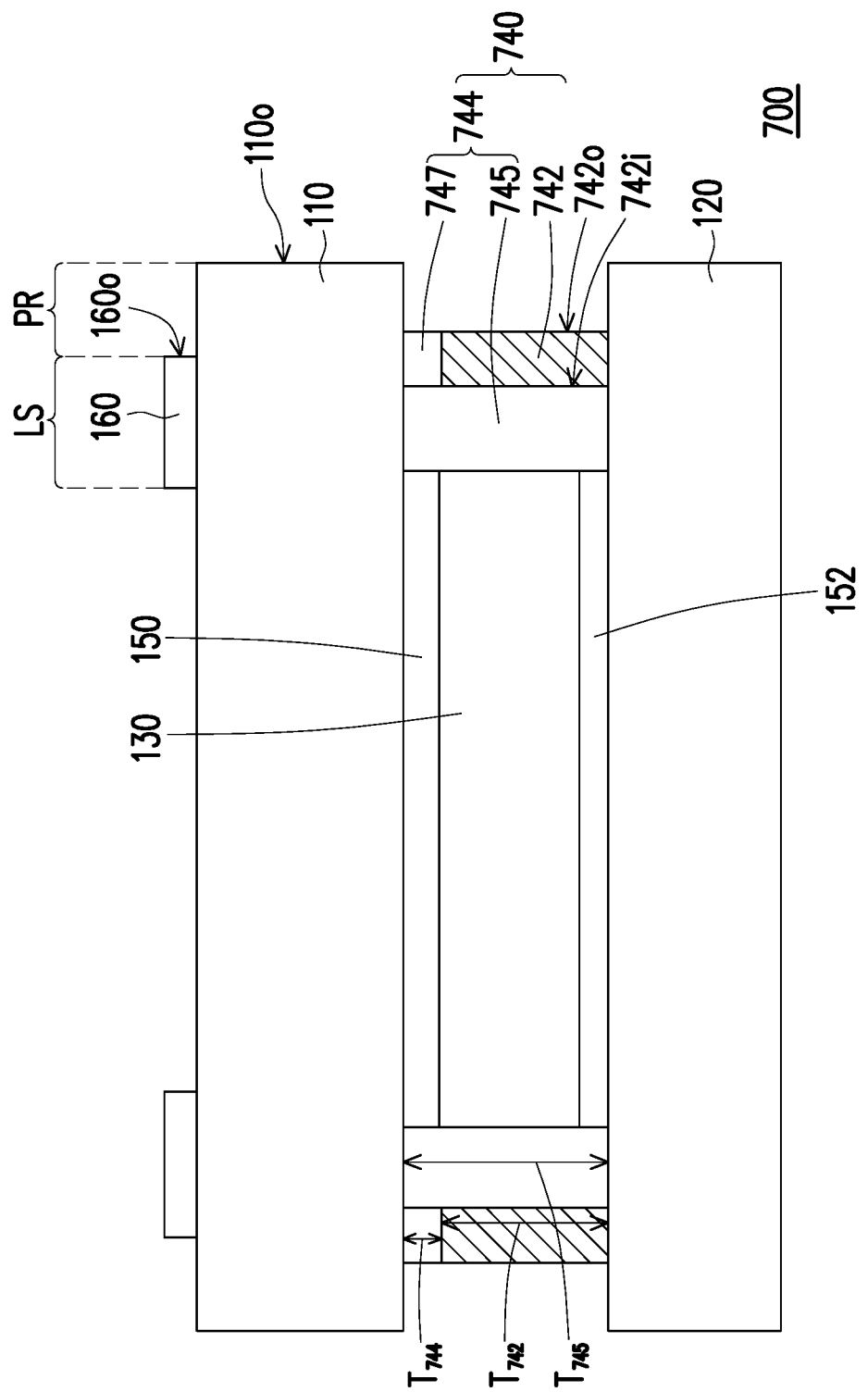
FIG. 10 shows a schematic cross-sectional view of a display panel according to an embodiment of the present disclosure.

In FIG. 9 and in FIG. 10 are shown the cross-sectional views of two display panels, 600 and 700, respectively, according to other embodiments of the present disclosure. The structure of the display panel 600 shown in FIG. 9 or the structure of the display panel 700 shown in FIG. 10 may be an implementing example of an embodiment of the present disclosure. Each of the display panel 600 shown in FIG. 9 and the display panel 700 shown in FIG. 10 is similar to the display panel 500A shown in FIG. 8A, and the same or similar reference numbers in the two embodiments represent the same or similar elements or components. The display panel 600 may include the top substrate 110, the bottom substrate 120, the display medium layer 130, the sealing structure 640, the top alignment layer 150, the bottom alignment layer 152, and the light shielding layer 160. The sealing structure 640 includes the sealing barrier 642 and the sealing layer 644. The sealing layer 644 includes the inner sealing portion 645 and the complemental sealing portion 647. As in display panel 500A of FIG. 8A, in display panel 600, the outer edge 642o of the sealing barrier 642 is exposed and not covered by the material of the sealing layer 644. In the sealing structure 640 the thickness $T_{642}$ of the sealing barrier 642 is smaller than the thickness $T_{645}$ of the inner sealing portion 645. In other words, in the display panel 600, whilst the inner sealing portion 645 contacts both the top substrate 110 and the bottom substrate 120, the sealing barrier 642 contacts only the top substrate 110. The complemental sealing portion 647 is disposed in contact with the sealing barrier 642, filling the gap between the sealing barrier 642 and the bottom substrate 120. In other words, the complemental sealing portion 647 may be disposed between the sealing barrier 642 and the bottom substrate 120. A vertical projection of the sealing barrier 642 on the top substrate 110 or on the bottom substrate 120 overlays a vertical projection of the complemental sealing portion 647 on the same substrate. A sum of the thickness $T_{642}$ of the sealing barrier 642 and the thickness $T_{647}$ of the complemental sealing portion 647 is substantially equal to the thickness $T_{645}$ of the inner sealing portion 645.

The display panel 700 may include the top substrate 110, the bottom substrate 120, the display medium layer 130, the sealing structure 740, the top alignment layer 150, the bottom alignment layer 152, and the light shielding layer 160. The sealing structure 740 includes the sealing barrier 742 and the sealing layer 744. The sealing layer 744 includes the inner sealing portion 745 and the complemental sealing portion 747. As in display panel 500A of FIG. 8A, in display panel 700, the outer edge 742o of the sealing barrier 742 is exposed and not covered by the material of the sealing layer 744. In the sealing structure 740 the thickness $T_{742}$ of the sealing barrier 742 is smaller than the thickness $T_{745}$ of the inner sealing portion 745. In other words, in the display panel 700, whilst the inner sealing portion 745 contacts both the top substrate 110 and the bottom substrate 120, the sealing barrier 742 contacts only the bottom substrate 120. The complemental sealing portion 747 is disposed in contact with the sealing barrier 742, filling the gap between the sealing barrier 742 and the top substrate 110. In other words, the complemental sealing portion 747 may be disposed between the sealing barrier 742 and the top substrate 110. A vertical projection of the sealing barrier 742 on the top substrate 110 or on the bottom substrate 120 overlays a vertical projection of the complemental sealing portion 747 on the same substrate. A sum of the thickness $T_{742}$ of the sealing barrier 742 and the thickness $T_{747}$ of the complemental sealing portion 747 is substantially equal to the thickness $T_{745}$ of the inner sealing portion 745.

It should be noted that whilst in FIG. 9 (FIG. 10) the sealing barrier 642 (742) is shown to physically contact the inner sealing portion 645 (745), in some alternative embodiments a gap (not shown) may separate the sealing barrier 642 (742) from the inner sealing portion 645 (745), similarly to what is discussed for the display panel 500B of FIG. 8B. In some embodiments, the inner edge 642i (742i) of the sealing barrier is coplanar with the outer edge 160o of the light shielding layer 160. Furthermore, whilst in FIG. 9 (FIG. 10) the sealing barrier 642 (742) and the complemental sealing portion 647 (747) are shown to be partially located in the light shielding region LS, with the remaining part being located in the peripheral region PR, the disclosure is not limited thereto. In some alternative embodiments, the sealing barrier 642 (742) and the complemental sealing portion 647 (747) may be entirely located in the light shielding region LS, similarly to what is discussed for display panel 500C of FIG. 8C. In some embodiments, the outer edge 642o (742o) of the sealing barrier 642 (742) is coplanar with the outer edge 160o of the light shielding layer 160. In some other embodiments, the sealing barrier 642 (742) and the complemental sealing portion 647 (747) may fill the entire peripheral region PR in between the top substrate 110 and the bottom substrate 120, similarly to what is discussed for the display panel 500D of FIG. 8D. In some embodiments, the outer edge 642o (742o) of the sealing barrier 642 (742) is aligned with the side edge 110o of the top substrate 110.

Figure 11:
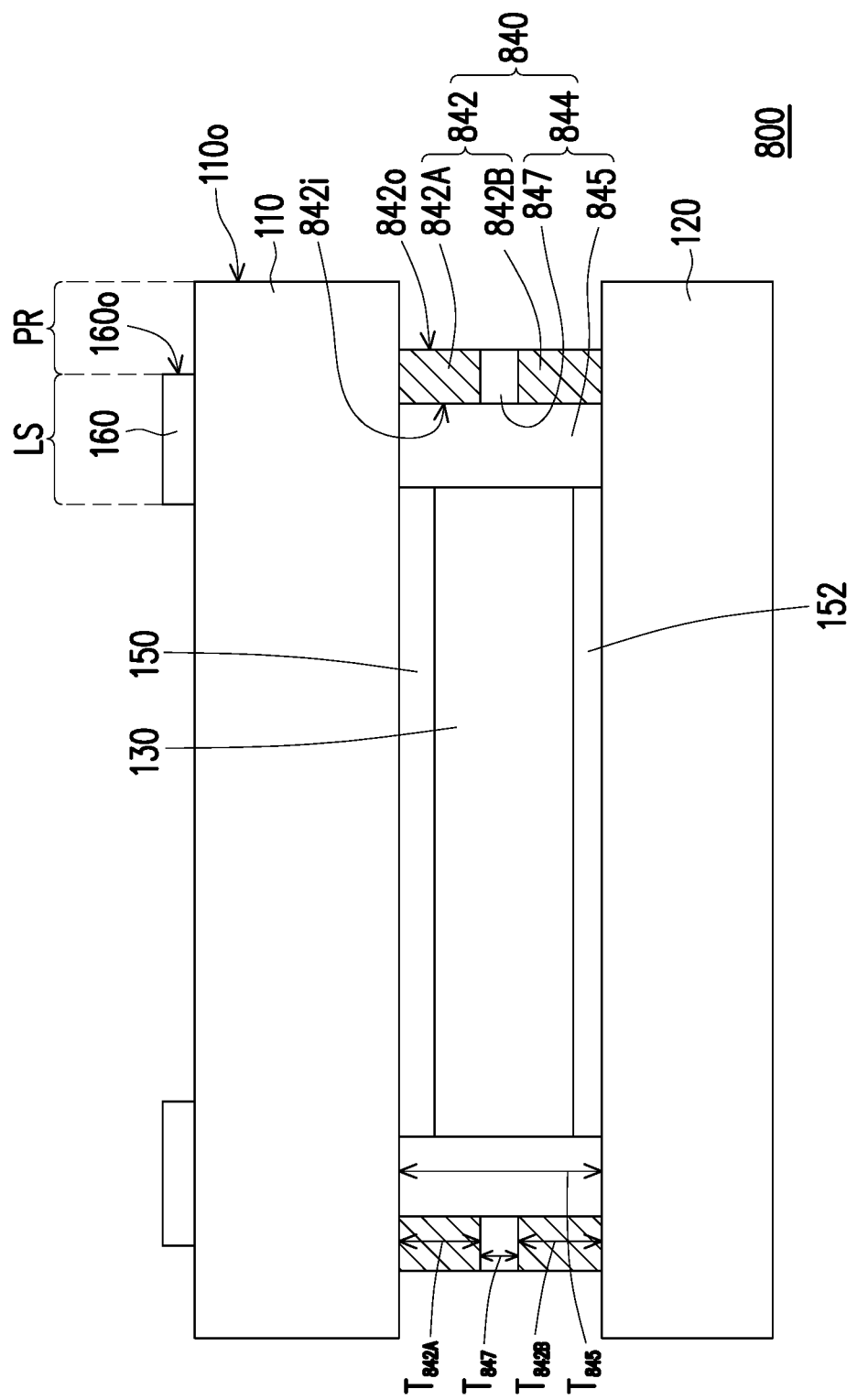
FIG. 11 shows a schematic cross-sectional view of a display panel according to an embodiment of the present disclosure.

In FIG. 11 is shown a cross-sectional view of a display panel 800, according to another embodiment of the present disclosure. The structure of the display panel 800 shown in FIG. 11 may be an implementing example of an embodiment of the present disclosure. The display panel 800 shown in FIG. 11 is similar to the display panel 600 (700) shown in FIG. 9 (FIG. 10), and the same or similar reference numbers in the two embodiments represent the same or similar elements or components. The display panel 800 may include the top substrate 110, the bottom substrate 120, the display medium layer 130, the sealing structure 840, the top alignment layer 150, the bottom alignment layer 152, and the light shielding layer 160. The sealing structure 840 includes the sealing barrier 842 and the sealing layer 844. The sealing barrier 842 includes a first barrier portion 842A and a second barrier portion 842B. The sealing layer 844 includes the inner sealing portion 845 and the complemental sealing portion 847. In some embodiments, the complemental sealing portion 847 is disposed between the first barrier portion 842A and the second barrier portion 842B. That is, the first barrier portion 842A, the complemental sealing portion 847 and the second barrier portion 842B may be vertically stacked in this order moving from the top substrate 110 to the bottom substrate 120. A vertical projection of the first barrier portion 842A on the top substrate 110 or on the bottom substrate 120 overlays a vertical projection of the complemental sealing portion 847 and a vertical projection of the second barrier portion 842B. In the sealing structure 840, the first bather portion 842A is in contact with the top substrate 110, whilst the second barrier portion 842B is in contact with the bottom substrate 120. The sum of the thickness $T_{842A}$ of the first barrier portion 842A, the thickness $T_{842B}$ of the second barrier portion 842B and the thickness $T_{847}$ of the complemental sealing portion 847 is equal to the thickness $T_{845}$ of the inner sealing portion 845. In some embodiments, as shown in FIG. 11, a vertical projection of the outer edge 160o of the light shielding layer 160 falls between the inner edge 842i and the outer edge 842o of the sealing barrier 842.

It should be noted that whilst in FIG. 11 the sealing barrier 842 is shown to physically contact the inner sealing portion 845, a gap (not shown) may separate the sealing barrier 842 from the inner sealing portion 845, similarly to what is discussed for the display panel 500B of FIG. 8B. In some embodiments, an inner edge 842i of the sealing barrier 842 may be aligned with the outer edge 160o of the light shielding layer 160. Furthermore, whilst in FIG. 11 the sealing barrier 842 and the complemental sealing portion 847 are shown to be partially located in the light shielding region LS, with the remaining part being located in the peripheral region PR, the disclosure is not limited thereto. In some alternative embodiments, the sealing barrier 842 and the complemental sealing portion 847 may be entirely located in the light shielding region LS, similarly to what is discussed for display panel 500C of FIG. 8C. In some embodiments, the outer edge 842o of the sealing barrier 842 is coplanar with the outer edge 160o of the light shielding layer 160. In some other embodiments, the sealing barrier 842 and the complemental sealing portion 847 may fill the entire peripheral region PR in between the top substrate 110 and the bottom substrate 120, similarly to what is discussed for display panel 500D of FIG. 8D. In some embodiments, the outer edge 842o of the sealing barrier 842 is aligned with a side edge 110o of the top substrate 110.

In light of the foregoing, the display panel according to an embodiment of the disclosure includes a sealing structure disposed between a top substrate and a bottom substrate, and encircling a display medium layer. The sealing structure may include a sealing layer and a sealing barrier. The sealing layer may include an inner sealing portion, and the inner sealing portion may be encircled by the sealing barrier and be disposed between the sealing barrier and the display medium layer. The sealing barrier may be made of an inorganic material. The water vapor transmittance through the sealing structure may be reduced and/or delayed so that the display medium layer encircled by the sealing structure may be protected against penetrating water vapor or contamination. In some embodiments, the sealing layer may further include an outer sealing portion, a complemental sealing portion, or a combination thereof. Accordingly, the sealing structure may protect the display medium layer against damages induced by environmental contaminants.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure, provided these falls within the scope of the following claims and their equivalents.

What is claimed is:
1. A display panel comprising:
a top substrate;
a bottom substrate opposite to the top substrate;
a display medium layer disposed between the top substrate and the bottom substrate;
a sealing structure sandwiched between the top substrate and the bottom substrate and encircling the display medium layer, the sealing structure comprising:
a sealing layer comprising an inner sealing portion; and
a sealing barrier, encircling the inner sealing portion of the sealing layer and made of an inorganic material having a water vapour transmittance rate smaller than the sealing layer, wherein the inner sealing portion is positioned between the sealing barrier and the display medium layer; and
a light shielding layer having a ring-like shape, wherein the light shielding layer is disposed on a surface of the top substrate facing away from the display medium layer, at least shields the inner sealing portion and a portion of the display medium layer close to the inner sealing portion, and exposes the other portion of the display medium layer.

2. The display panel of claim 1, wherein the sealing barrier is in physical contact with the sealing layer.

3. The display panel of claim 1, wherein an outer edge of the sealing barrier is aligned with a side edge of the top substrate.

4. The display panel of claim 1, wherein a thickness of the sealing barrier is equal to a thickness of the inner sealing portion.

5. The display panel of claim 1, wherein a thickness of the sealing barrier is less than a thickness of the inner sealing portion.

6. The display panel of claim 5, wherein the sealing layer further comprises a complemental sealing portion stacked with the sealing barrier, and a total thickness of the sealing barrier and the complemental sealing portion equals the thickness of the inner sealing portion.

7. The display panel of claim 6, wherein the sealing barrier comprises a first barrier portion and a second barrier portion, and the complemental sealing portion is positioned between the first barrier portion and the second barrier portion.

8. The display panel of claim 6, wherein the complemental sealing portion is disposed between the sealing barrier and one of the top substrate and the bottom substrate.

9. The display panel of claim 1, wherein the sealing layer further comprises an outer sealing portion surrounding the sealing barrier, and the sealing barrier is positioned between the outer sealing portion and the inner sealing portion.

10. The display panel of claim 1, wherein a gap separates an edge of the sealing barrier from the sealing layer.

11. The display panel of claim 1, wherein an inner edge of the sealing barrier is coplanar with an outer edge of the light shielding layer.

12. The display panel of claim 1, wherein an outer edge of the sealing barrier is coplanar with an outer edge of the light shielding layer.

13. The display panel of claim 1, wherein a vertical projection of an outer edge of the light shielding layer falls between an outer edge and an inner edge of the sealing barrier.

14. The display panel of claim 1, wherein the inorganic material comprises silicon oxide, silicon nitride, silicon oxynitride, metal oxide, metal nitride, metal oxynitride, or a combination thereof.

15. The display panel of claim 1, further comprising a top alignment layer disposed between the display medium layer and the top substrate and a bottom alignment layer disposed between the display medium layer and the bottom substrate.

16. The display panel of claim 15, wherein the top alignment layer is disposed on the top substrate in a coplanar manner with the inner sealing portion.

17. The display panel of claim 15, wherein the bottom alignment layer is disposed on the bottom substrate in a coplanar manner with the inner sealing portion.

18. The display panel of claim 1, wherein the sealing layer is made of a curable material.

19. A display panel comprising:
- a top substrate;
- a bottom substrate opposite to the top substrate;
- a display medium layer disposed between the top substrate and the bottom substrate; and
- a sealing structure sandwiched between the top substrate and the bottom substrate and encircling the display medium layer, the sealing structure comprising:
  - a sealing layer comprising an inner sealing portion; and
  - a sealing barrier, encircling the inner sealing portion of the sealing layer and made of an inorganic material having a water vapour transmittance rate smaller than the sealing layer, wherein the inner sealing portion is positioned between the sealing barrier and the display medium layer,
  - wherein the sealing barrier is formed of a plurality of barrier layers.

20. The display panel of claim 19, wherein the barrier layers stack sequentially in a direction from the top substrate to the bottom substrate.

21. The display panel of claim 19, wherein the barrier layers are arranged in a coplanar manner on one of the top substrate and the bottom substrate.

\* \* \* \* \*